United States Patent
Fujihana et al.

(10) Patent No.: US 7,192,538 B2
(45) Date of Patent: Mar. 20, 2007

(54) ANTISTATIC COMPOSITION

(75) Inventors: Noriaki Fujihana, Ashiya (JP);
Yoshiharu Tatsukami, Toyonaka (JP);
Masaki Enomoto, Yokohama (JP);
Ikuo Ohkoshi, Ota-ku (JP)

(73) Assignees: Sanko Chemical Industry Co., Ltd., Osaka (JP); Riken Technos Corporation, Tokyo (JP)

( * ) Notice: Subject to any disclaimer, the term of this patent is extended or adjusted under 35 U.S.C. 154(b) by 494 days.

(21) Appl. No.: 10/257,276

(22) PCT Filed: Mar. 1, 2001

(86) PCT No.: PCT/JP01/01578

§ 371 (c)(1),
(2), (4) Date: Oct. 11, 2002

(87) PCT Pub. No.: WO01/79354

PCT Pub. Date: Oct. 25, 2001

(65) Prior Publication Data

US 2003/0183810 A1     Oct. 2, 2003

(30) Foreign Application Priority Data

Apr. 12, 2000  (JP) ............... 2000-111018
Jul. 6, 2000   (JP) ............... 2000-204539
Jul. 6, 2000   (JP) ............... 2000-204540
Jul. 6, 2000   (JP) ............... 2000-204541

(51) Int. Cl.
   *H01B 1/00*     (2006.01)
   *C08K 5/10*     (2006.01)

(52) U.S. Cl. ............... 252/511; 252/500; 252/519.3; 528/81; 528/272; 528/274; 528/295.3; 528/298; 524/910; 525/437; 525/439; 525/444.5; 525/447; 525/448

(58) Field of Classification Search ........... 252/511, 252/518.1; 524/434, 436, 910, 912, 913; 525/66

See application file for complete search history.

(56) References Cited

U.S. PATENT DOCUMENTS 3,632,666 A    1/1972  Okazaki
4,806,571 A  * 2/1989  Knobel et al. ............. 521/107
4,872,910 A  * 10/1989 Eshleman et al. .......... 106/3
5,637,631 A  * 6/1997  Kitada et al. .............. 524/81
5,814,688 A  * 9/1998  Hilti et al. ................ 524/9
6,130,200 A  * 10/2000 Brodbeck et al. .......... 514/2

FOREIGN PATENT DOCUMENTS

| | | |
|---|---|---|
| EP | 0 555 197 A2 | 8/1993 |
| EP | 0 602 241 A1 | 6/1994 |
| EP | 0 909 785 A2 | 4/1999 |
| FR | 1 574 845 A | 7/1969 |
| JP | 59-096142 A | 6/1984 |
| JP | 64-009258 A | 1/1989 |
| JP | 02-255852 A | 10/1990 |
| JP | 02-284967 A | 11/1990 |
| JP | 05-140541 * | 6/1993 |
| JP | 05-140541 * | 1/1995 |
| JP | 08-012755 * | 1/1996 |
| JP | 09-151310 * | 6/1997 |
| JP | 09-227743 A | 9/1997 |
| JP | 09-263690 A | 10/1997 |
| JP | 10-182988 * | 7/1998 |
| JP | 10-338779 * | 12/1998 |
| JP | 11-039945 A | 2/1999 |
| WO | WO 99/33918 A1 | 7/1999 |

OTHER PUBLICATIONS

Carneiro et al, "Polylactic Acid-derived Materials," Synergy, 2001, pp. 1-6.*
Kim et al, "Thermal properties of Aro-flour-filled biodegradable polymer bio-composite," J.Therm.Anal.Cal., 2005, 81, pp. 299-306.*

* cited by examiner

*Primary Examiner*—Mark Kopec
*Assistant Examiner*—Kallambella Vijayakumar
(74) *Attorney, Agent, or Firm*—Birch, Stewart, Kolasch & Birch, LLP

(57) ABSTRACT

An antistatic composition containing various types of polymers such as a polyamide, an aliphatic polyester, an elastomer thereof and a polyurethane elastomer, and a metal salt in specific amounts, and preferably, an antistatic composition in which an additive component such as an organic compound which has an —{O(AO)$_n$}— group (A represents an alkylene group having 2 to 4 carbon atoms, and n represents an integer of 1 to 7) and all molecular chain terminals of which are $CH_3$ and/or $CH_2$ groups is compounded as needed.

5 Claims, No Drawings

ANTISTATIC COMPOSITION

TECHNICAL FIELD

This invention relates to an antistatic composition, and more particularly to an antistatic composition in which the bleeding-out is difficult to occur, and whose electric resistivity and formability are good. Further, the present invention relates to an antistatic composition which can be widely used in the field of melt-formable forming materials, and which is decomposable with microorganisms. The antistatic composition of the present invention is suitable for applications requiring high-degree antistatic treatment, including applications such as packaging and conveyance of electronic and electric parts.

The antistatic compositions have widely prevailed in the industrial world, and have been utilized in various applications. As the antistatic compositions, there are, for example, compositions in which resins and/or elastomers are highly filled with conductive fillers such as carbon black. Such compositions have been widely utilized mainly in the industrial field.

Further, electrostatic prevention type antistatic compositions in which electrostatic prevention type antistatic resins having surfactants or hydrophilic segments in their structure are polymer alloyed have also widely prevailed, and have been widely applied to various applications.

In recent years, antistatic polymer materials have prevailed in packaging of IC chips, and these materials have also been diversified from general-purpose plastics to engineering plastics. Further, measures for electrostatic prevention of precision instruments and relating instruments thereto have become increasingly important. As for the conductive fillers, carbon fiber, graphite, metal-coated fillers, metal fiber and the like as well as carbon black have been widely properly used depending on their purpose and function.

However, the conductive fillers have the inherent problem that the mechanical characteristics of polymers are deteriorated, or that forming is difficult.

In particular, into so-called thermoplastic elastomers having flexibility, the addition of the conductive fillers causes the problem that the flexibility (rubber elasticity), a material characteristic, is impaired. In some cases, the elastomers become very brittle by aging, which causes an extreme reduction in elongation to result in easy breakage.

Polyester elastomers have excellent characteristics such as high strength, wear resistance, oil resistance, chemical resistance and the like, and can be said to be representative of the thermoplastic elastomers. Although the polyester elastomers have flexibility, they generally have high hardness compared to the other elastomers, and have been widely used for applications from automobiles and home electric appliances including industrial members to convenience goods. In particular, they have been used mainly in applications requiring high hardness. As the conductive fillers added to the polyester elastomers, carbon black has been generally used. However, there is the inherent problem that carbon black added is unevenly distributed in specified phases, thereby deactivating the rubber elasticity to become brittle as materials, or that the conductivity fluctuates depending on the treatment conditions. Further, the addition of carbon black has raised the problems of deteriorated conductive performance due to a reduction in wear resistance and poor design caused by color limitation to black.

As a method for obtaining antistatic properties using no conductive filler, there is a method of adding a so-called low-molecular type hydrophilic surfactant. Further, a modifying method according to a glycol-based polymer material and an ion such as a mixture of an alkylene glycol copolymer resin and an ionic electrolyte is disclosed in Japanese Patent Laid-Open Publication (Hei) 2-284967 and the like. However, the low-molecular type hydrophilic surfactant has problems with regard to persistency of the effect, heat resistance, bleeding-out, high resistivity and the like. Further, the mixture of the alkylene glycol copolymer resin and the ionic electrolyte has the problem that the bleeding-out easily occurs by concernment of temperature and moisture, because a terminal of the alkylene glycol copolymer resin has a hydroxyl group. Furthermore, the amount to be added is limited by the presence of a hard segment crystalline component of the polyester elastomer, so that there is the problem that the resistivity of the composition does not reach a sufficient level.

Further, thermoplastic polyurethane elastomers have excellent wear resistance and mechanical strength, and are widely applied. Conductive polyurethane elastomers containing conductive fillers also prevail. In recent years, with the spread of precision instruments, higher antistatic functions have been required, and the conventional antistatic level has become insufficient. The thermoplastic polyurethane elastomers compounded with the conductive fillers represented by carbon black are excellent in conductivity, but bring about a reduction in flexibility and processability. Besides, they have the problem of the dropout of the conductive materials due to a reduction in wear resistance and the problem of poor design caused by color limitation to black.

Further, as for antistatic compositions as materials for IC trays, which have hitherto been used for package of IC chips, weight saving, thinning and downsizing have come to be studied, and strength and high rigidity tend to be required. Furthermore, for the identification of the kind of IC and the like, it is also required that design such as coloring is given to trays and carrier tapes. Carbon black generally used in the conductive fillers is economical, and provides compositions having low resistivity. However, the color is limited to black, and generally, a problem arises with regard to processability, material strength and the like. Accordingly, carbon black has been usually used as composite materials compounded together with various modifying materials.

Antistatic agents include surface activity type ones giving the function by allowing them to bleed on surfaces, and ones allowing the function to be exhibited by polymer alloying hydrophilic polymer materials referred to as so-called polymer type antistatic agents. In the polymer type antistatic agents, permanent antistatic performance is imparted to thermoplastic resins by polymer alloying with the hydrophilic polymers, and the industrial utility value thereof is high. However, it is required that the alloyed antistatic resins are added in relatively large amounts, and many antistatic resins are hydrophilic segments and have flexibility. Accordingly, the rigidity of the materials is lowered, and the deformation problem of formed articles arises. Although it has been tried to modify these resins by using them in combination with inorganic fillers, glass fiber or the like, flashing, weld marks, flash marks, shagginess and the like are developed on the surfaces of formed articles, resulting in insufficient surface smoothness. The hindrance to surface smoothness causes wide variations in surface resistivity, or exerts effects on contact states of electronic and electric parts, thereby inhibiting the antistatic functions.

In these compositions, the surface resistivity considered to be an antistatic level is usually up to $10^{10}$ to $10^{12}$ Ω/sq.

In recent years, by an increase in performance and capacity of ICs, LSIs and the like, a characteristic of $10^{10}$ Ω/sq. or less has come to be required as the electric characteristics required for the package application such as trays, and the so-called conventional antistatic region level has become insufficient. Ones constituted by carbon black has been overwhelmingly used. As for these, characteristics generally required are also strength and elastic modulus in bending, and inorganic fillers are generally added in relatively large amounts in order to meet the requirements (Japanese Patent Laid-Open Publication (Sho) 59-96142). However, mica, talc and the like widely used as the inorganic fillers are added in relatively large amounts, so that materials constituted by the conductive fillers have the problem that variations in conductivity become wide, as well as the problem that deterioration of processability and impact-resistant strength and the like are promoted.

On the other hand, in order to prevent deterioration of these strength characteristics, chopped fibers such as glass fiber, carbon fiber and the like are used in combination in some cases. Although these chopped fibers are effective for imparting rigidity and strength, the surface smoothness of formed articles such as flashing, weld marks, flash marks, shagginess and the like is not satisfied. Further, with deterioration of the surface state of the formed articles, the contact with instruments becomes insufficient, which hinders leakage of charges.

In recent years, it has become important to impart antistatic properties to rubber, and in order to achieve this, there is known a method of coating a surface of a formed article with an antistatic agent such as a surfactant, or a method of kneading an antistatic agent therein. However, in the former method, the antistatic properties are significantly deteriorated with the elapse of a long period of time, so that it is difficult to put to practical use as highly antistatic rubber having persistency. On the other hand, in the later method, there is the problem that the antistatic agent bleeds out on the surface of the formed article, or the problem that the antistatic effect is reduced, because of poor compatibility of the antistatic agent with the rubber.

Further, a method of kneading carbon black, carbon fiber or the like in rubber has also been proposed. According to this method, the above-mentioned problem can be solved, because of persistency of the antistatic properties and electrostatic prevention. However, the problem that the rubber hardness becomes high to impair flexibility is encountered, in addition to the new problem that coloration can not be freely conducted.

Here, as a problem for solving dispersibility and compatibility of these problems of the antistatic rubber composition, there is proposed a method of compounding an antistatic plasticizer and rubber. This is a method in which the antistatic properties are given to the plasticizer for chlorine-containing resin, which is a component indispensable to various kinds of processes. For example, a vinyl chloride composition containing an antistatic plasticizer comprising lithium perchlorate is illustrated, in Japanese Patent Laid-Open Publication (Sho) 64-9258 and Japanese Patent Laid-Open Publication (Hei) 2-255852.

However, the addition of a perchlorate such as lithium perchlorate arises the problem that the heat stability of a vinyl chloride-based resin is impaired. Further, the addition thereof to chlorine-containing rubber such as chloroprene rubber arises the problem that the heat stability is impaired.

Further, Japanese Patent Laid-Open Publication (Hei) 9-227743 proposes a method of adding a plasticizer and bis(trifluoromethanesulfonyl)imidolithium to a vinyl chloride-based resin, thereby providing a transparent conductive composition. This composition is a transparent conductive composition, so that it can be easily colored. However, this composition has the problem that it turns burned umber on heating at 120° C. for 90 minutes to lose the transparency and the conductivity, because of its poor heat resistance. Further, this composition has the problem that the plasticizer bleeds out.

The synthetic resins synthesized from petroleum starting materials are represented by polyethylene, polypropylene, polystyrene, polyvinyl chloride, polyesters, polyamides and the like, and have been widely used from essential commodities of life to industrial products. The convenience and economical efficiency of these synthetic resins come to largely support our life, and the synthetic resins have surely become the basis of the petrochemical industry.

Therefore, the amount of production of the synthetic resins domestically produced amounts to about 15,000,000 tons per year, and they are discarded in prodigious quantities amounting to about one third thereof. Accordingly, waste disposal by burning and reclamation had already reached the critical limit. In recent years, movements such as resource recovery, recycling and the like have been intensified, and the synthetic resins are newly added in the Containers and Packaging Recycling Law enforced from 2000. It is therefore predicted that strong and effective recovery and reusing of the synthetic resins are required. However, in view of the synthetic resins produced in prodigious quantities every year, situations where recycling is difficult, such as the use in applications where recovery is difficult, are left.

Further, synthetic resin products scattered in the natural environment has become significant from year to year, which cause serious social problems such as an increase in necessity of wildlife protection and destruction of living environments.

Such problems over the environment have attracted more attention from year to year, and the central government including the Ministry for the Environment and respective local governments have been driven by the necessity for seriously taking measures to meet the situation.

In the synthetic resin market, movements to demands for decomposability of the resins in the natural environment have been intensified, and biodegradable resins have been developed which are decomposed and made to resource in the course of time even when thrown away outdoors. On the other hand, from measures against toxic gases generated in burning the synthetic resins, synthetic materials nearer to natural materials have been desired, and also as part of the burning measures, demands for the biodegradable resins have risen.

The biodegradable resins are resins degradable with microorganisms in the soil, seawater, rivers and lakes, and expansion to applications in which recycling of synthetic resin wastes is inefficient and economically poor has been rapidly spread. Also as for measures against scattered trash, the value of the biodegradable resins has been increasingly recognized, and it is expected that the utilization thereof is hereafter further widened.

At present, construction of commercial composts proceeds in various locations. On the other hand, the sale of composts for domestic use toward individual consumers also starts. Thus, expansion of the biodegradable resins has been expected in various locations. Also in the Ministry of Economy, Trade and Industry, the practical application investigative committee has started, and movements toward the promotion of the biodegradable resins have been intensified. Further, viewing worldwide, a massive market is predicted to appear in which a considerable part of demands for the synthetic resins on the scale of an annual production of 100,000,000 tons is occupied by the biodegradable resins. In the 21st century, serious expansion of the biodegradable resin market is surely predicted.

As biodegradable materials and environmentally low load type materials which are in practical use at present, there are known aliphatic polyesters, modified starch, polylactic acid, various composite materials in which these resins are used as matrixes, polymer alloys and the like. Of these, the aliphatic polyester resins have high biodegradability, and has been widely studied as packaging materials.

On the other hand, packaging materials subjected to so-called antistatic treatment are required for packaging electronic and electric materials. In recent years, however, materials more excellent in antistatic ability have been required in order to increase the capacity of semiconductors and to prevent electrostatic destruction of precision instruments.

Measures to electrostatic charges have hitherto been conducted by compelxing according to the addition of surfactants or persistent polymer type surfactants. However, many of the packaging materials made of synthetic resins, which have been subjected to so-called antistatic treatment, become discarded wastes after the packaging and conveying functions have been performed. Although the Containers and Packaging Recycling Law has prevailed and recycle systems have been enforced in recent years, many of the packaging materials are still difficult to be recovered, and disposed by way of such as burning and reclamation. In such a situation, ecologically concerned materials have come to be necessary also for packaging materials requiring high antistatic functions, and measures have been studied by various techniques.

Many of the biodegradable resins are hydrophilic ones, which include, for example, cellulose acetate, polycaprolactone, polyvinyl alcohol and the like, and functionally have antistatic characteristics. However, the antistatic properties depend on the environmental humidity, so that the variation in antistatic performance becomes wide. Further, there is also proposed a method of adding conductive fillers such as carbon black and the like, thereby imparting and stabilizing antistatic performance. However, the use of the conductive fillers limits color tones to black, so that there is the problem that the use as packaging materials make it difficult to identify internal products, or that forming processing is difficult to allow the resistivity to fluctuate according to the forming situation.

Further, there is also reported the case that the addition of carbon black to a biodegradable resin generally reduces the biodegradable function.

Cases of static prevention using the biodegradable materials are disclosed in Japanese Patent Laid-Open Publication (Hei) 9-263690, Japanese Patent Laid-Open Publication (Hei) 11-039945 and the like. However, in such static prevention, there are problems that it is necessary to mix the conductive fillers in relatively large amounts, so that the material themselves are apt to become hard and brittle, that the color tones of the products are limited to black, so that identification of the inside is impossible when the products are used as packaging materials, and that the antistatic properties are lost according to forming conditions, particularly, physical functions in stretching processing.

Further, when the surfactants are added to the biodegradable resin materials, thereby imparting the antistatic properties, problems are encountered with regard to persistency of the effect, wide variations in time showing the effect, durability such as environmental humidity dependency and the environment used.

In the meantime, polyamide resins are excellent in wear resistance, chemical resistance and heat resistance, and have been widely used. However, the developments of polyamide compositions high in electric insulation and excellent in conductivity have been expected.

Further, polyamide elastomers have excellent wear resistance and mechanical strength, and are widely applied. Conductive polyamide elastomers containing conductive fillers also widely prevail. In recent years, with the spread of precision instruments, higher antistatic functions have been required, and the conventional antistatic level has become insufficient. The thermoplastic polyamide resins and the thermoplastic polyurethane elastomers compounded with the conductive fillers represented by carbon black are excellent in conductivity, but bring about a reduction in flexibility and processability. Besides, they have the problem of the dropout of the conductive materials due to a reduction in wear resistance and the problem of poor design caused by color limitation to black.

On the other hand, one in which the so-called hydrophilic surfactant is used as a conductive material, the mixture of the alkylene glycol copolymer resin family and the ionic electrolyte (Japanese Patent Laid-Open Publication (Hei) 2-284967) and the like are proposed. However, the bleeding-out easily occurs according to the temperature and moisture, because the terminal of the copolymer has a hydroxyl group, and problems arise with regard to surface stains and persistency of the effect.

The present invention has been made against the background of such conventional technical problems, and an object thereof is to obtain an antistatic composition in which the bleeding-out of an electric conductive substance is little, and whose volume resistivity and formability are good.

DISCLOSURE OF THE INVENTION

The present invention relates to an antistatic composition (hereinafter also referred to as a "first composition") containing (A) a polyamide and/or a polyamide elastomer, and (B) a metal salt composed of a cation which is an alkali metal or an alkali earth metal and an anion which can be formed by ionic dissociation, wherein the amount of component (B) is from 0.001 to 3.0 parts by weight based on 100 parts by weight of component (A).

Here, it is preferred that the above-mentioned first composition further contains (C) an organic compound which has an —{O(AO)$_n$}— group (A represents an alkylene group having 2 to 4 carbon atoms, and n represents an integer of 1 to 7) and all molecular chain terminals of which are CH$_3$ and/or CH$_2$ groups.

Further, the ratio of the above-mentioned component (C) to 100 parts by weight of the above-mentioned component (A) is preferably from 0.1 to 10 parts by weight.

Then, the present invention relates to an antistatic composition (hereinafter also referred to as a "second composition") containing (D) an aliphatic polyester and/or a thermoplastic polyester elastomer, and the above-mentioned component (B), wherein the amount of component (B) is from 0.001 to 3.0 parts by weight based on 100 parts by weight of component (D).

Here, it is preferred that the above-mentioned second composition further contains the above-mentioned component (C).

Further, the ratio of the above-mentioned component (C) to 100 parts by weight of the above-mentioned component (D) is preferably from 0.1 to 10 parts by weight.

Then, the present invention relates to an antistatic composition (hereinafter also referred to as a "third composition") containing 8 to 60 parts by weight of (F) a plasticizer and 0.01 to 5.0 parts by weight of the above-mentioned component (B), based on 100 parts by weight of (E) a polylactic acid-based resin.

Here, the above-mentioned plasticizer (F) is preferably at least one selected from the group consisting of a citric ester, a glycerol fatty acid ester, a phthalic ester, a fatty acid ester and the above-mentioned component (C).

Then, the present invention relates to an antistatic composition (hereinafter also referred to as a "fourth composition") containing 0.001 to 8.0 parts by weight of the above-mentioned component (B) based on 100 parts by weight of the total amount of 50 to 95 parts by weight of (E) a polylactic acid-based resin and 50 to 5 parts by weight of (G) a polyester resin having a glass transition temperature of 30° C. or less (provided (E)+(G)=100 parts by weight).

Here, it is preferred that the above-mentioned fourth composition further contains component (C), and 0.00005 to 5.0 parts by weight of the above-mentioned component (B) and 0.03 to 15.0 parts by weight of the above-mentioned component (C), based on 100 parts by weight of the total amount of the above-mentioned components (E) and (G).

Then, the present invention relates to an antistatic composition (hereinafter also referred to as a "fifth composition") containing (H) a thermoplastic polyurethane elastomer and the above-mentioned component (B), wherein the amount of component (B) is from 0.001 to 3.0 parts by weight based on 100 parts by weight of component (H).

Here, the above-mentioned fifth composition preferably contains the above-mentioned component (C).

Further, the ratio of the above-mentioned component (C) to 100 parts by weight of the above-mentioned component (H) is preferably from 0.1 to 10 parts by weight.

Then, the present invention relates to an antistatic composition (hereinafter also referred to as a "sixth composition") containing (I) a thermoplastic resin, (J) a polar group-containing thermoplastic elastomer, the above-mentioned component (B), the above-mentioned component (C), and (K) a scale-like inorganic filler and/or a fibrous inorganic filler, wherein the amount of component (B) is from 0.003 to 12.5 parts by weight based on 100 parts by weight of the total of components (I) and (J).

Here, the above-mentioned component (J) may be at least one selected from the group consisting of a polyamide elastomer, a polyester elastomer and a polyurethane elastomer.

Further, it is preferred that the above-mentioned component (J) is a polyetheresteramide resin, and that 25 to 3 parts by weight of component (J) is contained based on 75 to 97 parts by weight of component (I).

Further, the above-mentioned polyetheresteramide resin is preferably a polyether segment-containing antistatic elastomer, and the antistatic elastomer is preferably one derived from an alkylene oxide addition product of a polyamide having carboxyl groups at both terminals and a bisphenol, and/or from a polyoxyalkylene glycol.

Further, the above-mentioned component (K) is preferably at least one selected from the group consisting of calcium silicate fiber, mica and talc.

Furthermore, the above-mentioned component (J) is contained in an amount of 25 to 3 parts by weight based on 75 to 97 parts by weight of the above-mentioned thermoplastic resin (I) (provided (I)+(J)=100 parts by weight).

In addition, the ratio of the above-mentioned component (C) to 100 parts by weight of the above-mentioned component (J) is preferably from 0.1 to 20 parts by weight.

Then, the present invention relates to an antistatic composition (hereinafter also referred to as a "seventh composition") containing the above-mentioned component (B) in an amount of 0.001 to 3.0 parts by weight based on 100 parts by weight of (L) at least one polymer selected from the group consisting of natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber.

Here, it is preferred that the above-mentioned seventh compound further contains the above-mentioned component (C).

Further, the ratio of the total of the above-mentioned component (B) and component (C) to 100 parts by weight of the above-mentioned component (L) is preferably from 0.5 to 25 parts by weight.

In each composition described above, the above-mentioned component (B) is preferably at least one lithium salt selected from the group consisting of lithium perchlorate, lithium trifluoromethanesulfonate, bis(trifluoromethanesulfonyl)imidolithium and tris(trifluoromethanesulfonyl)methanelithium.

Further, in each composition described above, the above-mentioned component (C) is preferably bis[2-(2-butoxyethoxy)ethyl]adipate or bis(2-buthoxyethyl)phthalate.

Furthermore, in each composition described above, the ratio of the above-mentioned component (B) to the total amount of the above-mentioned component (B) and component (C) is preferably from 0.1 to 50% by weight.

Each composition described above may be a pelletized composition obtained by melt kneading constituent components.

Further, each composition described above may be a directly formable composition obtained by dry blending constituent components.

Furthermore, the composition of the present invention may be one obtained by using as a master batch a pelletized compound obtained by melt kneading parts of the above-mentioned various polymers, components (B) and (C), and another constituent component as needed, and mixing it with the remainders of the polymer components and the like.

The compositions of the present invention are described below in the order of the first to seventh compositions. However, for the components already described in each composition, descriptions thereof are omitted.

BEST MODE FOR CARRYING OUT THE INVENTION

First Composition

The first composition is an antistatic composition containing (A) a polyamide and/or a polyamide elastomer, and (B) a metal salt composed of a cation which is an alkali metal or an alkali earth metal and an anion which can be formed by ionic dissociation. Preferably, it may contain the following component (C).

The polyamide, component (A) of the present invention, is the general term for amide-based resins having amide bonds in their repeating units. Examples thereof include nylon 6, nylon 6,6, nylon 12 and the like, a polyamide polyester copolymer, a polyamide polyether copolymer and the like.

The polyamide elastomer, component (A) of the present invention, is the general term for thermoplastic elastomers each having a polyamide restricting phase which is a hard segment and a polyether or polyester structure as a soft segment. For example, a polyamide elastomer in which a PA 12 component is used as the polyamide (PA) restricting phase is obtained by a method of reacting laurolactam, a dicarboxylic acid and a polyetherdiol under pressure and heating by addition of a lactam ring-opening catalyst to obtain a carboxyl telechelic nylon 12 oligomer, and then a thermoplastic elastomer by condensation reaction with the polyetherdiol. In addition to this, PA 6 or the like can be used as the polyamide restricting phase.

The above-mentioned synthesis method provides the polyamide elastomer having the basic structure of a polyether block polyamide elastomer or a polyetherester block polyamide elastomer. Here, the polyamide elastomer having various characteristics is obtained according to the kind of diol used in the above-mentioned synthesis method, and the like.

The polyamide elastomers are high in high-temperature characteristics and excellent in mechanical characteristics, oil resistance, low-temperature characteristics and the like, so that they have been widely used for sports goods and the like, as well as for machine parts, automotive parts and the like.

The glass transition temperature (Tg) of component (A) of the present invention is preferably 60° C. or less, more preferably 50° C. or less, and particularly preferably 40° C. or less. When it exceeds 60° C., sufficient antistatic properties are not obtained.

Further, for the purpose of improving processability and characteristics, it is also possible to use the polyamide and the polyamide elastomer in the form of a polymer alloy or a polymer blend, with another resin.

Then, (B) the metal salt used in the present invention is a compound composed of a cation which is an alkali metal or an alkali earth metal and an anion which can be formed by ionic dissociation.

The alkali metals and the alkali earth metals which are cations of (B) the metal salts include, for example, Li, Na, K, Mg, Ca and the like. As the cation, preferred is $Li^+$, $Na^+$ or $K^+$ having a small ionic diameter, and particularly preferred is lithium ion ($Li^+$).

Further, the anions which can be formed by ionic dissociation, constituent elements of the metal salts of the present invention, include, for example, $Cl^-$, $Br^-$, $F^-$, $I^-$, $NO_3^-$, $SCN^-$, $ClO_4^-$, $CF_3SO_3^-$, $BF_4^-$, $(CF_3SO_2)_2N^-$, $(CF_3SO_2)_3C^-$ and the like. Preferred are $ClO_4^-$, $CF_3SO_3^-$, $(CF_3SO_2)_2N^-$ and $(CF_3SO_2)_3C^-$, and more preferred are $CF_3SO_3^-$, $(CF_3SO_2)_2N^-$ and $(CF_3SO_2)_3C^-$.

Although there are many metal salts composed of the above-mentioned cations and anions, preferred are lithium perchlorate $LiClO_4$, sodium perchlorate $NaClO_4$, magnesium perchlorate $Mg(ClO_4)_2$, potassium perchlorate $KClO_4$, lithium trifluoromethanesulfonate $Li(CF_3SO_3)$, bis(trifluoromethanesulfonyl)imidolithium $Li.N(CF_3SO_2)_2$, bis(trifluoromethanesulfonyl)imidopotassium $K.N(CF_3SO_2)_2$, bis(trifluoromethanesulfonyl)imidosodium $Na.N(CF_3SO_2)_2$, tris(trifluoromethanesulfonyl)methanelithium $Li.C(CF_3SO_2)_3$ and tris(trifluoromethanesulfonyl)methanesodium $Na.C(CF_3SO_2)_3$ among others. Lithium perchlorate, lithium trifluoromethanesulfonate, bis(trifluoromethanesulfonyl)imidolithium and tris(trifluoromethanesulfonyl)methanelithium are more preferred among others. In particular, lithium trifluoromethanesulfonate, bis(trifluoromethanesulfonyl)imidolithium and tris(trifluoromethanesulfonyl)methanelithium are preferred, and only the addition thereof in small amounts reduces the resistivity, resulting in further exhibition of the above-mentioned effect. However, obtaining a biodegradable antistatic composition, $LiClO_4$, $NaClO_4$, $Mg(ClO_4)_2$, $KClO_4$, $(CF_3SO_3)Li$, $(CF_3SO_2)_2NLi$, $(CF_3SO_2)_2NNa$, $(CF_3SO_2)_3CLi$ or $(CF_3SO_2)_3CNa$ is preferred.

The composition of the present invention contains at least one of these metal salts.

Although (B) the metal salts can be used alone, the dissociated state of the metal salts is insufficient, so that the excessive amount added is required in many cases. Further, some metal salts are highly hazardous. It is therefore better to use the metal salt previously dissolved in the following compound (C).

Dissolution can be conducted by a conventional method of adding component (B) to component (C), followed by stirring under conditions of ordinary temperature to heating (75° C. or less).

The amount of (B) the metal salt compounded is from 0.001 to 3.0 parts by weight, and preferably from 0.3 to 2.4 parts by weight, based on 100 parts by weight of component (A). Less than 0.001 part by weight results in insufficient conductivity, whereas exceeding 3.0 parts by weight results in no more preferable change in conductivity and in deterioration of physical properties and heat resistance.

Further, the amount of component (B) compounded is usually from 0.1 to 50 parts by weight, and preferably from 1 to 40 parts by weight, based on 100 parts by weight of component (C) described below. Less than 0.1 part by weight results in failure to obtain sufficient antistatic properties, whereas even exceeding 50 parts by weight results in an insufficient improvement in the antistatic effect, and conversely causes the progress of crystallization, deterioration of materials and the like to lower the antistatic effect.

Component (C) of the present invention is an organic compound which has an —$\{O(AO)_n\}$— group (A represents an alkylene group having 2 to 4 carbon atoms, and n represents an integer of 1 to 7) and all molecular chain terminals of which are $CH_3$ and/or $CH_2$ groups. The above-mentioned $CH_2$ groups at the molecular chain terminals have carbon atoms linked by double bonds.

The above-mentioned compound (C) has the effect on improvements in solubility and dissociation stability of the metal salt in the composition of the present invention.

Component (C) used in the present invention can be produced by a common method for producing an ester compound, for example, using an alcohol obtained by adding 1 to 7 moles of an alkylene oxide having 2 to 4 carbon atoms to 1 mole of a branched aliphatic alcohol and a dibasic acid as starting materials.

Here, examples of the above-mentioned alcohols include hydroxyl group-containing compounds obtained by adding 1 to 7 moles of ethylene oxide, 1 to 4 moles of propylene oxide or 1 to 3 moles of butylene oxide to 1 mole of propanol, 1 to 6 moles of ethylene oxide or 1 to 3 moles of propylene oxide to butanol, 1 to 2 moles of ethylene oxide to hexanol, 1 to 5 moles of ethylene oxide, 1 to 3 moles of propylene oxide or 1 to 2 moles of butylene oxide to pentanol, 1 to 5 moles of ethylene oxide, 1 to 3 moles of propylene oxide or 1 to 3 moles of butylene oxide to octanol, and 1 to 4 moles of ethylene oxide, 1 to 2 moles of propylene oxide or 1 to 2 moles of butylene oxide to nonanol, respectively.

Of these compounds, 2-(2-butoxyethoxy)ethanol obtained by adding 2 moles of ethylene oxide to 1 mole of butanol, and 2-butoxyethanol obtained by 1 mole of ethylene oxide to 1 mole of butanol are good in a balance with processability.

Further, the above-mentioned dibasic acids include carboxylic acids such as adipic acid, sebacic acid, phthalic acid and succinic acid, carboxylic acid anhydrides thereof and the like.

Component (C) produced using the above-mentioned starting materials is preferably a compound whose terminals are alkyl groups having no hydroxyl groups. Particularly preferred is dibutoxyethoxyethyl adipate (bis[2-(2-butoxyethoxy)ethyl]adipate) shown in the following chemical formula (1), or bis(2-butoxyethyl) phthalate shown in the following chemical formula (2):

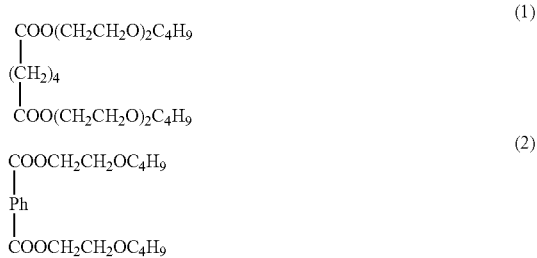

When component (C) is contained in the composition, the amount of component (C) added is preferably from 0.1 to 10 parts by weight, and more preferably from 0.3 to 8 parts by weight, based on 100 parts by-weight of component (A). Less than 0.1 part by weight results in the difficulty of obtaining sufficient conductivity, whereas exceeding 10 parts by weight results in a significant reduction in viscosity of the resulting composition, which causes deterioration of physical characteristics, as well as a reduction in forming processability such as draw down properties and deterioration of dimensional stability of a formed article.

Second Composition

The second composition is an antistatic composition containing (D) an aliphatic polyester and/or a thermoplastic polyester elastomer, and the above-mentioned component (B), and may contain the above-mentioned component (C).

As the aliphatic polyester, compound (D) of the present invention, there can be used one generally commercially available as a biodegradable polyester. Although examples thereof include BIONOLLE (trade name) sold by SHOWA HIGHPOLYMER CO., LTD., a resin corresponding to the application or characteristics can be arbitrarily selected. Industrially, there is mentioned one obtained by the dehydration polycondensation reaction and the diol elimination reaction, using an aliphatic dicarboxylic acid and excess diol as starting materials. Such aliphatic polyesters are generally polybutylene succinate, polyethylene succinate and copolymers thereof, and various polymer types are industrially produced.

Aliphatic polyesters (D) suitably used in the present invention include polybutylene succinate (a binary type condensation product of succinic acid and 1,4-butanediol), polybutylene succinate adipate (a ternary type condensation product of succinic acid, adipic acid and 1,4-butanediol) and the like.

Further, as for aliphatic polyester (D) of the present invention, it is also possible to introduce a reactive group such as an isocyanate group or a urethane group to its structure for the purpose of improving functionality insofar as the biodegradable function is not impaired. Furthermore, as aliphatic polyester (D) of the present invention, there can also be used various copolymers such as copolyesters obtained by copolymerization of polylactic acid and the like.

The glass transition temperature (Tg) of aliphatic polyester (D) used in the present invention is preferably not more than ordinary temperature (25° C.), and more preferably from 10 to 20° C. Exceeding 25° C. results in failure to obtain sufficient antistatic properties.

In the present invention, the antistatic composition is obtained by compounding the above-mentioned aliphatic polyester (D) and the above-mentioned component (B).

When the above-mentioned component (C) is not contained in the composition, the content of metal salt (B) is from 0.001 to 3.0 parts by weight, and preferably from 0.01 to 2.5 parts by weight, based on 100 parts by weight of aliphatic polyester (D). Less than 0.001 part by weight results in failure to obtain the sufficient antistatic effect, whereas even exceeding 3.0 parts by weight results in no improvement in the antistatic effect, and conversely causes the progress of crystallization, deterioration of materials and the like to lower the antistatic effect.

Further, when the above-mentioned component (C) is contained in the composition, the content of metal salt (B) is from $3 \times 10^{-6}$ to 4.5 parts by weight, preferably from $5 \times 10^{-5}$ to 3 parts by weight, based on 100 parts by weight of aliphatic polyester (D). Less than $3 \times 10^{-6}$ part by weight results in failure to obtain the sufficient antistatic effect, whereas even exceeding 4.5 parts by weight results in no improvement in the antistatic effect, and conversely causes the progress of crystallization, deterioration of materials and the like to lower the antistatic effect.

As a compounding method of metal salt (B) to aliphatic polyester (D), it is possible to directly mix metal salt (B) with the resin by melt mixing or dry blend mixing, when the content of metal salt (B) is as small as 0.01 to 2.5 parts by weight. However, when the content of metal salt (B) is increased, the variation in the dispersibility in the resin becomes wide, and the hazard as described above is accompanied. It is therefore desirable to use the metal salt previously dissolved in the above-mentioned compound (C) or the like.

The thermoplastic polyester elastomer, component (D) of the present invention, is a multi-block copolymer using a polyester as a hard segment in a molecule, and a polyether or a polyester having a low glass transition temperature (Tg) as a soft segment. Components (D) include a polyester/polyether type using an aromatic crystalline polyester such as polybutylene terephthalate or the like as a hard segment, and a polyether as a soft segment, a polyester/polyester type using an aromatic crystalline polyester as a hard segment, and an aliphatic polyester as a soft segment, and the like.

The polyester/polyether type is, for example, one synthesized by the ester exchange reaction and the polycondensation reaction, using dimethyl terephthalate, 1,4-butanediol, polytetramethylene ether glycol and the like as starting materials. Further, the polyester/polyether type can also be synthesized by the ester exchange reaction and the ring opening reaction, using dimethyl terephthalate, 1,4-butanediol, ε-caprolactone and the like as starting materials.

As component (D) of the present invention, all of the usual thermoplastic polyester elastomers can be used. They can be used either alone or as a combination or two or more of them.

When the above-mentioned component (C) is used, the content of component (B) is usually from 0.1 to 30 parts by weight, preferably from 1 to 25 parts by weight, based on 100 parts by weight of component (C). Less than 0.1 part by weight results in failure to obtain the sufficient antistatic effect, whereas even exceeding 30 parts by weight results in no improvement in the antistatic effect, and conversely causes the progress of crystallization, deterioration of materials and the like to lower the antistatic effect.

The amount of compound (C) added is preferably from 0.1 to 10 parts by weight, and more preferably from 0.3 to 8 parts by weight, based on 100 parts by weight of component (D). Less than 0.1 part by weight results in the difficulty of obtaining sufficient conductivity, whereas exceeding 10 parts by weight results in a significant reduction in viscosity of the resulting composition, which causes deterioration of physical characteristics, as well as a reduction in forming processability such as the draw down properties and deterioration of dimensional stability of a formed article.

The hardness of the composition of the present invention in which the polyester elastomer is used as component (D) is usually from 40 to 70 degrees, and preferably from 50 to 60 degrees, by the hardness D based on ASTM D2240. For example, when a polyester such as polyethylene terephthalate (PET) or polybutylene terephthalate (PBT) is added to the composition of the present invention as a third composition, one having a high hardness of 70 degrees or more is obtained.

Third Composition

The third composition is an antistatic composition containing 8 to 60 parts by weight of (F) a plasticizer and 0.01 to 5.0 parts by weight of the above-mentioned component (B), based on 100 parts by weight of (E) a polylactic acid-based resin.

Polylactic acid-based resin (E) used in the present invention is a homopolymer of lactic acid, a copolymer of lactic acid and another hydroxycarboxylic acid or lactone, or a composition thereof. Lactic acid may be L-lactic acid, D-lactic acid or a mixture thereof. Typical examples of the other hydroxycarboxylic acids include glycolic acid, 3-hydroxybutyric acid, 4-hydroxybutyric acid, 3-hydroxyvaleric acid, 4-hydroxyvaleric acid, 6-hydroxycaproic and the like. Further, they may be derivatives of these hydroxycarobxylic acids such as esterified products thereof. The lactones include caprolactone.

This polylactic acid-based resin can be produced by polymerization of the above-mentioned monomer, with coexistence of a comonomer as needed, by a method such as the condensation polymerization method or the ring-opening polymerization method. It may be a copolymer with an aliphatic polyester composed of an aliphatic polyhydric alcohol and an aliphatic polybasic acid. For the purpose of obtaining a high-molecular weight resin, a small amount of a chain extender such as a diisocyanate, diepoxy, acid anhydride or acid chloride compound may be allowed to coexist.

Plasticizer (F) in the present invention is preferably one having two or more ester groups and/or two or more ether groups in its molecule. Examples thereof include an organic compound which has an $-\{O(AO)_n\}-$ group (A represents an alkylene group having 2 to 4 carbon atoms, and n represents an integer of 1 to 7) and all molecular chain terminals of which are $CH_3$ and/or $CH_2$ groups such as triethylene glycol diacetyl $CH_3CO(OCH_2CH_2)_3OCOCH_3$ or dibutoxyethoxyethyl adipate shown in the above-mentioned chemical formula (1), and a plasticizer having an ether group or an ester group in its molecule, as well as a citric ester such as acetyltributyl citrate, a glycerol fatty acid ester such as triacetin or glycerol dicapryl monoacetyl, a phthalic ester such as dibutyl phthalate or dioctyl phthalate, a fatty acid ester such as dioctyl adipate, and the like. These plasticizers can be used either alone or as a combination of two or more of them. Liquid plasticizers are preferably used.

Of these plasticizers, the citric ester and glycerol fatty acid ester plasticizers having a high plasticizing efficiency are preferred. On the other hand, a method for producing a pellet compound or a powder compound by dissolving metal salt (B) in plasticizer (F) is industrially efficient, and it is necessary to dissolve metal salt (B) in plasticizer (F). The citric ester and glycerol fatty acid ester plasticizers can dissolve metal salt (B). However, when component (B) is added in large amounts, it is also a preferred method to use an ether group-containing plasticizer such as dibutoxyethoxyethyl adipate or triethylene glycol diacetyl, which is particularly high in the ability to dissolve component (B).

The content of plasticizer (F) in the present invention is from 8 to 60 parts by weight, and preferably from 10 to 40 parts by weight, based on 100 parts by weight of component (E). Less than 8 parts by weight results in failure to obtain the antistatic effect, whereas exceeding 60 parts by weight causes the problem of significantly deteriorating mechanical characteristics.

The content of metal salt (B) is from 0.01 to 5.0 parts by weight, and preferably from 0.01 to 3.0 parts by weight, based on 100 parts by weight of component (E). Less than 0.01 part by weight results in failure to obtain the sufficient antistatic effect. On the other hand, even when the content exceeds 5.0 parts by weight, the antistatic effect is scarcely improved, and conversely, deterioration of materials and the like are brought about.

Fourth Composition

The fourth composition is an antistatic composition containing 0.001 to 8.0 parts by weight of the above-mentioned component (B) based on 100 parts by weight of the total amount of 50 to 95 parts by weight of a polylactic acid-based resin (E) and 50 to 5 parts by weight of (G) a polyester resin having a glass transition temperature of 30° C. or less (provided (E)+(G)=100 parts by weight). It is preferred that the fourth composition further contains the above-mentioned component (C). In that case, it is preferred that the fourth composition contains 0.00005 to 5.0 parts by weight of the above-mentioned component (B) and 0.03 to 15.0 parts by weight of the above-mentioned component (C), based on 100 parts by weight of the total amount of the above-mentioned components (E) and (G).

The polyester resin of (G) in the present invention may be either an aliphatic polyester or an aromatic polyester, and one generally commercially available as a biodegradable polyester can be arbitrarily selected depending on the application or characteristics. Preferred is the aliphatic polyester. Specific examples thereof include BIONOLLE #3020 (trade name) manufactured by SHOWA HIGHPOLYMER CO., LTD., which is polybutylene succinate adipate, and CELGREEN PH7 (trade name) manufactured by DAICEL CHEMICAL INDUSTRIES, LTD., which is polycaprolactone.

Further, as for the polyester resin of the present invention, it is also possible to introduce a reactive group such as an isocyanate group or a urethane group to its structure for the purpose of improving functionality insofar as the biodegradable function is not impaired. Furthermore, as the polyester resin of the present invention, there can also be used various copolymers such as copolyesters in which polycarbonates and the like are copolymerized with polyester.

The glass transition temperature (Tg) of polyester resin (G) used in the present invention is 30° C. or less, and preferably 10° C. or less. Exceeding 30° C. results in failure to obtain sufficient antistatic properties.

Further, the content of component (E) of the present invention is from 50 to 95 parts by weight, and preferably from 70 to 95 parts by weight, taking the total of component (E) and component (G) as 100 parts by weight. Less than 50 parts by weight results in failure to maintain the physical properties of polylactic acid itself, whereas exceeding 95 parts by weight results in failure to obtain the antistatic effect.

Furthermore, in the present invention, even when a metal salt (B)-soluble liquid, for example, triacetin or monoacetyl glyceride, is used besides the above-mentioned compound (C), processability for the compound is excellent, which is industrially useful.

In the case of component (E) and component (G) not containing the above-mentioned component (C), the content of metal salt (B) is from 0.001 to 8.0 parts by weight, and preferably from 0.01 to 3.0 parts by weight, based on 100 parts by weight of the total of components (E) and (G). Less than 0.001 part by weight results in failure to obtain the sufficient antistatic effect. On the other hand, even when the content exceeds 8.0 parts by weight, the antistatic effect is scarcely improved, and conversely, the progress of crystallization, deterioration of materials and the like are brought about.

In the case of component (E) and component (G) containing the above-mentioned component (C), the content of metal salt (B) is from 0.00005 to 5.0 parts by weight, and preferably from 0.005 to 3.0 parts by weight, based on 100 parts by weight of the total of components (E) and (G). Less than 0.0005 part by weight results in failure to obtain the sufficient antistatic effect. On the other hand, even when the content exceeds 5.0 parts by weight, the antistatic effect is scarcely improved, and conversely, the progress of crystallization, deterioration of materials and the like are brought about.

The content of the above-mentioned component (C) is preferably from 0.03 to 15 parts by weight, more preferably from 0.5 to 10 parts by weight, and particularly preferably from 0.5 to 5 parts by weight, based on 100 parts by weight of the total of components (E) and (G). Less than 0.03 part by weight is industrially unfavorable, whereas exceeding 15 parts by weight causes the fear of the occurrence of the bleeding-out.

Fifth Composition

The fifth composition is an antistatic composition containing (H) a thermoplastic polyurethane elastomer and the above-mentioned component (B), and preferably contains the above-mentioned component (C).

Thermoplastic polyurethane elastomer (H) is a urethane group-containing thermoplastic elastomer, and a straight chain multi-block copolymer of a polyurethane as a soft segment which is obtained by the reaction of a long-chain glycol with an isocyanate and a polyurethane as a hard segment which is composed of a short-chain glycol and an isocyanate. A crosslinking agent (chain extender) is also used as needed.

Here, according to the general classification of the long-chain glycols based on the kind, polyether-based glycols include polyethylene oxide, polypropylene oxide and a copolymer thereof, polyester-based glycols include a polyadipate, a polylactone and a polycarbonate, and aliphatic glycols include polybutadiene, polyisoprene and the like.

Further, as the short-chain glycol, there is generally used an aliphatic glycol such as ethylene glycol, 1,4-butanediol or 1,6-hexanediol, an alicyclic glycol such as cyclohexanedimethanol, and an aromatic glycol such as hydroquinonebis(2-hydroxyethyl)ether.

On the other hand, as the above-mentioned isocyanate, there is used 4,4'-diphenylmethane diisocyanate (MDI), 2,4' & 2,6-toluene diisocyanate (TDI) or the like.

Further, as the above-mentioned crosslinking agent (chain extender), there is used an aromatic diamine such as 3,3-dichloro-4,4-diaminophenylmethane (MOCA).

The above-mentioned thermoplastic polyurethane elastomers (H) can be used either alone or as a combination of two or more of them.

The content of metal salt (B) is from 0.001 to 3.0 parts by weight, and preferably from 0.01 to 2.5 parts by weight, based on 100 parts by weight of the above-mentioned component (H). Less than 0.001 part by weight results in failure to obtain the sufficient antistatic effect, whereas even exceeding 3.0 parts by weight results in no improvement in the antistatic effect, and conversely causes the progress of crystallization, deterioration of materials and the like to lower the antistatic effect.

When the above-mentioned compound (C) is used, the content of compound (C) is preferably from 0.1 to 10 parts by weight, and more preferably from 0.3 to 8 parts by weight, based on 100 parts by weight of thermoplastic polyurethane elastomer (H). Less than 0.1 part by weight results in the difficulty of obtaining sufficient conductivity, whereas exceeding 10 parts by weight results in a significant reduction in viscosity of the resulting composition, which causes deterioration of physical characteristics, as well as a reduction in forming processability such as the draw down properties and deterioration of dimensional stability of a formed article.

Sixth Composition

The sixth composition is an antistatic composition containing (I) a thermoplastic resin, (J) a polar group-containing thermoplastic elastomer, the above-mentioned component (B), the above-mentioned component (C), and (K) a scale-like inorganic filler and/or a fibrous inorganic filler, wherein the amount of component (B) is from 0.003 to 12.5 parts by weight based on 100 parts by weight of the total of components (I) and (J).

Thermoplastic resin (I) used in the composition of the present invention may be any as long as it is a thermoplastic resin. Examples thereof include vinyl monomer polymers or copolymers such as polyvinyl chloride, a polystyrenic resin such as polystyrene or an acrylonitrile-butadiene-styrene copolymer (ABS resin), and an acrylate/methacrylate-based resin; poly(α-olefins) such as low density polyethylene, intermediate density polyethylene, high density polyethylene, low-pressure-processed low density polyethylene, polypropylene, polybutene-1 and poly(4-methylpentene-1), copolymers of α-olefins or α-olefins with other monomers such as a propylene-ethylene block copolymer and a propylene-ethylene random copolymer; other polyolefinic resins; polyamides such as nylon 6, nylon 66 and nylon 12; aromatic polyesters such as polyethylene terephthalate and polybutylene terephthalate and aliphatic polyesters; liquid crystal polyesters; aromatic polyethers such as polyphenylene oxide; polyacetal-based resins; polycarbonate-based resins; polyimides; sulfone-based polymers such as a polysulfone and a polyethersulfone; epoxy resins; phenol resins; diallyl phthalate resins and melamine resins.

In the present invention, from the above-mentioned thermoplastic resins, one or a mixture of two or more of them is suitably selected according to the purpose.

Above all, vinyl monomer polymers or copolymers such as polyvinyl chloride, polystyrene and an acrylonitrile-butadiene-styrene copolymer (ABS resin); polypropylene, crystalline propylene copolymers such as a crystalline propylene-ethylene copolymer and a crystalline propylene-butene-1 copolymer, nylon and polybutylene terephthalate are preferred from the viewpoint of formability. In particular, vinyl monomer polymers or copolymers such as polyvinyl chloride, polystyrene and an acrylonitrile-butadiene-styrene copolymer (ABS resin) are preferred.

Further, from the viewpoint of heat resistance, polycarbonates, polyethylene terephthalate, aromatic polyimides and aromatic polyethers are preferred.

Polar group-containing thermoplastic elastomers (J) include polyamide elastomers, polyester elastomers, polyurethane elastomers and the like contained in the above-mentioned components (A), (D) and (H). The above-mentioned thermoplastic elastomer is preferably one having a soft segment and a hard segment. The soft segment achieves the effect that an elastomer molecular chain moves easily resulting in the lower glass transition temperature (Tg) of the elastomer. Examples thereof include a polyether segment and a polyester segment. The hard segment restrains the partial molecular movement, and can be a physical crosslinking point. The combination of these segments achieves the effect of providing a thermoplastic elastomer excellent in rubber elasticity and maintaining mechanical characteristics of the elastomer. Examples thereof include polyester, polyamide and polyurethane elastomers and the like.

Of these, the polyurethane elastomer is a urethane group-containing thermoplastic elastomer, and one similar to the above-mentioned thermoplastic polyurethane elastomer (H) can be used.

Further, as the polyester elastomer of component (J), there can be used one similar to the thermoplastic polyester elastomer of the above-mentioned component (D).

In addition, an aliphatic polyester resin having a low glass transition temperature and the like are available as component (J).

Among the polyester elastomers of component (D), the polyetheresteramide is particularly preferred as component (J). In general, a polyether type nonionic surfactant has hydrophilicity by virtue of hydrogen bonding of an oxygen atom of an ether bond in a polyether chain with a hydrogen atom of a water molecule.

The above-mentioned polyetheresteramide is one type of such polyether segment-containing high molecular nonionic surfactants. Specific examples of the polyetheresteramides include a polyethylene glycol-polyamide copolymer, a polyethylene glycol-methacrylate copolymer, a polyethylene oxide/polypropylene oxide copolymer, a polyethylene glycol-based polyesteramide copolymer, a polyethylene glycol-based polyester elastomer and the like, which are polyether segment-containing antistatic elastomers. The antistatic elastomer is preferably a polyetheresteramide resin derived from an alkylene oxide addition product of a polyamide having carboxyl groups at both terminals and a bisphenol, and/or from a polyoxyalkylene glycol.

The polyetheresteramide may previously optionally contain at least one of the above-mentioned component (B).

Then, as the polyamide elastomers used as component (J), the polyamide elastomers mentioned as the above-mentioned component (A) are available.

Further, each of these elastomers may previously optionally contain at least one of component (B).

These elastomers have hydrophilic segments such as polyethers in their structure, and the elastomers themselves have the antistatic function, so that the antistatic function can be imparted by polymer alloying the elastomers with thermoplastic resins. However, the surface resistivity obtained is up to a level of $10^{11}$ to $10^{12}$ Ω/sq., and can not be reduced to $10^{10}$ Ω/sq. or less.

These elastomers can also be used together with other polymers in the polymer alloy or polymer blend form.

The glass transition temperature (Tg) of component (J) of the present invention is preferably 50° C. or less, more preferably 40° C. or less, and particularly preferably 30° C. or less. When it exceeds 50° C., it is difficult to exhibit the antistatic function in the ordinary use environment.

In the sixth composition, the ratio of component (J) to the above-mentioned thermoplastic resin (I) is preferably 25 to 3 parts by weight of component (J) to 75 to 97 parts by weight of component (I), and more preferably 20 to 5 parts by weight of component (J) to 80 to 95 parts by weight of component (I), taking (I)+(J) as 100 parts by weight. When the compounding ratio of component (J) exceeds 25 parts by weight, the electric characteristics are good, but the forming shrinkage factor is large, and the dimensional stability is poor, resulting in unsuitability for a precision formed article. On the other hand, when the ratio of component (J) is less than 3 parts by weight, the electric characteristics are insufficient.

In the sixth composition, the compounding amount of component (B) is preferably from 0.003 to 12.5 parts by weight, and more preferably from 0.03 to 10 parts by weight, based on 100 parts by weight of the total of the above-mentioned component (I) and component (J). Less than 0.003 part by weight results in failure to obtain sufficient antistatic properties, whereas even exceeding 12.5 parts by weight results in no improvement in the antistatic effect, and conversely causes the progress of crystallization, deterioration of materials and the like to lower the antistatic effect.

When the above-mentioned component (J) is the polyetheresteramide resin, the content of component (B) is preferably from 0.1 to 30 parts by weight, and more preferably from 1 to 25 parts by weight, based on 100 parts by weight of polyetheresteramide resin. Less than 0.1 part by weight results in failure to obtain sufficient antistatic properties, whereas even exceeding 30 parts by weight results in no improvement in the antistatic effect, and conversely causes the progress of crystallization, deterioration of materials and the like to lower the antistatic effect.

The amount of component (C) added is preferably from 0.1 to 20 parts by weight, and more preferably from 0.5 to 10 parts by weight, based on 100 parts by weight of elastomer (J). Less than 0.1 part by weight results in the difficulty of obtaining sufficient conductivity, whereas exceeding 20 parts by weight results in a significant reduction in viscosity of the resulting composition, which causes the occurrence of the bleeding-out and deterioration of physical characteristics, as well as the difficulty in forming processing.

Inorganic Filler (K);

Component (K) used in the sixth composition is a scale-like inorganic filler and/or a fibrous inorganic filler, preferably at least one selected from the group consisting of calcium silicate fiber, mica and talc, and more preferably calcium silicate fiber. The calcium silicate fiber is a compound represented by $CaSiO_3$, and produced from a calcareous starting material and a siliceous starting material. This is a compound having as a basic skeleton a single chain structure in which tetrahedrons are linked in a unitary direction, in its crystal structure. As for the size of the fiber, the average fiber diameter is from 1 to 10 µm, and the average fiber length is from 8 to 70 µm, preferably from 10 to 70 µm, and more preferably from 20 to 50 µm. When the average fiber length is less than 8 µm, the sufficient physical reinforcement effect and dimensional stability are not obtained. On the other hand, when the average fiber length exceeds 70 µm, problems such as deteriorated appearance of a formed article, warping and deformation arise. One is also available to which surface treatment such as titanate coupling or silane coupling is applied in order to enhance the compatibility with components (B), (C), (I) and (J).

The ratio of component (K) contained in the sixth composition is from 3 to 80 parts by weight, and preferably from 5 to 60 parts by weight, based on 100 parts by weight of the total of components (B), (C), (I) and (J). When the ratio of component (K) contained is less than 3 parts by weight, the dimensional stability is poor, resulting in unsuitability for a precision formed article. On the other hand, exceeding 80 parts by weight results in deteriorated formability, smoothness of a surface of a formed article and strength.

In preparing the sixth composition, methods for adding the respective components and the order thereof can be suitably selected. However, preferably, melt mixing of inorganic filler (K), preferably calcium silicate fiber, after (B), (C), thermoplastic resin (I) and component (J) have come into a molten state, reduces fiber breakage to prevent the material strength from falling.

Seventh Composition

The seventh composition is an antistatic composition containing (L) a polymer which is a specific rubber-type polymer and the above-mentioned component (B) in specific amounts, and may preferably contain the above-mentioned component (C).

Examples of polymers (L) used in the present invention include rubber-type polymers having a glass transition temperature (Tg) of room temperature or lower, such as natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber.

In the seventh composition, the amount of metal salt (B) compounded is from 0.001 to 3.0 parts by weight, and preferably from 0.3 to 2.4 parts by weight, based on 100 parts by weight of the above-mentioned component (L). Less than 0.001 part by weight results in insufficient conductivity, whereas exceeding 3.0 parts by weight results in no change in conductivity and deteriorated physical properties and heat resistance.

The ratio of the total of above-mentioned components (B) and (C) to 100 parts by weight of the above-mentioned component (L) is preferably from 0.5 to 25 parts by weight, and more preferably from 1 to 20 parts by weight. When the ratio is less than 0.5 part by weight, high antistatic properties in the present invention is not obtained. On the other hand, exceeding 25 parts by weight causes high cost.

The ratio of component (B) to the total amount of the above-mentioned component (B) and component (C) is preferably from 0.1 to 50% by weight, and more preferably from 0.5 to 40% by weight. When the ratio is less than 0.1% by weight, the antistatic properties are not sufficiently exhibited. On the other hand, exceeding 50% by weight results in saturation of the effect of imparting the antistatic properties, which causes an economical disadvantage.

In the component (L)-containing composition of the present invention, a cation of component (B) can easily move in the composition, so that the ionic conductivity is extremely high to exhibit excellent antistatic properties. Further, a solution comprising component (B) and component (C) is excellent in dispersibility and compatibility, so that the occurrence of the bleeding-out on a surface of a formed article can be inhibited to maintain the excellent antistatic properties for a long period of time.

Further, the component (L)-containing composition of the present invention can also be easily colored by adding a pigment as a coloring agent. As the above-mentioned pigments, there are exemplified inorganic pigments such as talc, titanium oxide, iron oxide red, clay, silica white and calcium carbonate, organic pigments such as an azo dye, a phthalocyanine dye and carbon black, and the like. The constitution of the present invention has the advantages of excellent thermal stability and no impairment of physical properties of a substrate resin.

Common Matters of the Composition of the Present Invention

The antistatic composition of the present invention can contain additives such as a stabilizer, a coloring agent, a plasticizer, a dispersing agent, an ultraviolet absorber, an antioxidant, a flame retardant, a stabilizer, a reinforcing agent, a lubricant, a foaming agent, a weather (light) resistant agent and a metal powder, as long as the purpose of the invention is not impaired.

When the antistatic composition of the present invention has biodegradability, it is preferred that a polymer material and an organic additive arbitrarily added have biodegradable characteristics or are harmless to the natural world. For example, the polymers include a microorganism-derived polyester, polycaprolactone, polylactic acid, modified starch, a polyesteramide and the like. An organic material-based lubricant, a metal salt stabilizer such as calcium, a glycol-based or fatty acid-based wax, petroleum-based wax and the like can also be added. As the coloring agent, there can be used iron oxide red, carbon black, titanium oxide or the like, and as the inorganic filler, there can also be used a special filler such as barium sulfate or a metal powder, as well as natural ore-derived calcium carbonate, talc, mica, calcium silicate, silica or the like. Almost all fillers are generally harmless, and can be suitably added according to the purpose.

In addition to the above-mentioned fillers, it is also possible to blend purified pulp, starch, wood powder, chaff and the like as natural fillers according to the purpose. These organic, inorganic and natural fillers not only enhance the biodegradable function, but also are effective for cost reduction of relatively expensive biodegradable resins.

As the coloring agents used in the compositions of the present invention, all are available as long as they are ones used as coloring agents for synthetic resins. However, in applications intended for biodegradation, biodegradable coloring agents or ones low in toxicity when only the coloring agents remain after degradation are preferred.

Particularly preferred examples of the coloring agents include a food dye and an inorganic pigment. As the food dye, there is available an aluminum lake dye such as red No. 2, No. 3 or No. 40 for food dye, yellow No. 4 or No. 5 for food dye, green No. 3 for food dye, blue No. 1 or No. 2 for food dye, or the like. Furthermore, as the inorganic pigment, there is available titanium oxide, iron oxide red, ultramarine blue or the like.

Although these coloring agents may be used alone, two or more of them are usually combined, thereby being able to mix colors to a desired color tone.

The use of these coloring agents provides formed articles of respective colors, which make it possible to identify the formed articles.

The composition of the present invention is preliminarily mixed and melt kneaded, and can be used as a pelletized compound which is an ordinary fabrication material form. The pellet processing allows the respective components to uniformly preliminarily disperse, thereby being able to obtain stability as a polymer characteristic.

As preliminary mixers used in the processing of the pelletized compounds, there are used blenders for the purposes of preliminary dispersion, distribution and diffusion mixing. Typical examples of the lenders include a ribbon blender, a Henschel mixer (super mixer), a tumbler mixer, a tumble mixer, an air blender and the like. These preliminary mixers are selected according to the plasticizer to be filled, the form of a supplementary material and the level of diffusion. Further, the respective compounding materials may each be put in a melt kneader, using different quantitative cutting-out devices such as Brabender or different quantitative liquid addition devices, respectively, without using the preliminary mixer.

The antistatic compositions of the present invention can be produced without problems using ordinary devices and equipment used for mixing and kneading of usual thermoplastic resins. As an extruder, favorable is a single-screw kneading extruder equipped with a vent or twin-screw kneading extruder equipped with a vent of which screws rotate in the same direction or opposite directions. Further, in place of the extruder, a kneader such as a super mixer, a Banbury mixer, a kneader, a tumbler and a co-kneader may be used.

The melt extruders generally include a single-screw extruder, a twin-screw extruder, a Banbury type, a roll type and the like. Also for these, it is possible to produce the pelletized starting material by selecting them according to the form and purpose of the composition and productivity, followed by melt kneading.

Further, the composition of the present invention can also be used as a powder type obtained by dry blending of the compounding materials. It is also possible to produce a starting material of a powder type mixture by dry blending, using the preliminary mixer used in the processing of the above-mentioned pelletized compound.

Furthermore, the composition of the present invention may be one obtained by using a pelletized compound as a master batch, which is obtained by melt kneading parts of the above-mentioned various polymers, components (B) and (C), and another constituent component as needed, and mixing it with the remaining polymer components. For example, in preparing the first composition, a part of component (A), component (B) and component (C) are previously melt kneaded to obtain a pelletized compound, and then, this is mixed as a mater batch with the remainder of component (A) to obtain the desired first composition.

Using the composition of the present invention, all forming methods can be applied. That is to say, in forming articles, the composition is melted with each forming machine, and forming processing by various forming machines such as extrusion forming including contour extrusion, injection forming, blow forming, calender forming, vacuum forming and emboss forming is possible. As the typical forming machines for injection forming, extrusion forming and the like, ones having ordinary specifications generally used can be employed.

In the antistatic composition of the present invention, the form of the composition is generally pelletized. However, on the ground that component (C) is usually a liquid, a method of directly adding it to the melt kneader without passing it through the preliminary mixer may be used.

For example, in the case of injection forming, it is possible to use an ordinary injection forming machine. In general, the use of the pelletized compound provides a good finish of a formed article, and a stable physical performance.

When components (D) and (E) are used in each of the second to fourth compositions in the antistatic compositions of the present invention, it is necessary to pay attention to moisture absorption of the starting materials in all forming processing procedures, and preliminary drying and measures against the moisture absorption during forming are important. Insufficient drying causes foaming of a melt composition resulting in the deterioration of the appearance and mechanical characteristics of a formed article. Further, there is also a fear of the deteriorated appearance of a formed article due to a fall in viscosity by hydrolysis.

It is desirable to conduct preliminary drying by either method of a hot air type and a vacuum type before forming, and to prevent moisture absorption with a hopper dryer or the like during forming.

The antistatic compositions of the present invention can be suitably used for the antistatic measures of the above-mentioned machine parts, automotive parts, sports goods, office automation equipment, the home electric appliance field, the electric and electronic fields, other various parts, packages, tubes, coverings and the like, making use of their excellent characteristics.

BEST MODE FOR CARRYING OUT THE INVENTION

The present invention is illustrated with reference to examples and comparative examples below, but the present invention is not limited by these examples.

Parts and percentages in examples are on a weight basis unless otherwise noted.

First Composition

Various types of components used in examples and comparative examples were as follows:

Component (A)

PEBAX 2533 (trade name) manufactured by Elf Atochem was used as polyamide elastomer (A-1).

Metal Salt (B);

Bis(trifluoromethanesulfonyl)imidolithium Li.N$(CF_3SO_2)_2$ was used alone as metal salt (B-1).

Solution of Metal Salt (B)+Compound (C);

"Sankonol 0862-18" (trade name) manufactured by Sanko Chemical Industry CO., Ltd. was used as solution [(B-2)+(C-1)] (18), in which lithium perchlorate $LiClO_4$ was dissolved as a metal salt in dibutoxyethoxyethyl adipate (bis[2-(2-butoxyethoxy)ethyl]adipate) (C-1) represented by the above-mentioned chemical formula (1), in an amount of 18%.

Further, MP100 manufactured by Akishima Chemical Industries CO., Ltd. was used as solution [(B-3)+(P)], in which a metal salt (NaClO$_4$) was contained in alkylene oxide compound CH$_3$OCH$_2$CH$_2$OCH$_2$CH$_2$OH (B-3) in an amount of 36%.

Furthermore, low-molecular type hydrophilic surfactant (Q-1), glycerol monostearate (trade name: "RIKEMAL S-100" manufactured by Riken Vitamin Co., Ltd.), was used as an additive in comparative examples.

Preparation of Test Pieces

Sample pellets were molded into each test piece with an injection molding machine of a mold clamping pressure of 80 tons/cm$^2$. The molding conditions were as follows. Cylinder temperature: 220° C. Mold temperature: 30° C.

As for measurements of physical properties, measurements of the following physical properties were made, after the test piece was controlled at room temperature (23±2° C.) and a relative humidity of 50% for 24 hours.

Tensile Strength and Elongation

Measurements were made in accordance with JIS K7311.

Volume Resistivity (Conductivity)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity between both the electrodes was measured. The unit in the following tables is Ω·cm.

Evaluation of Bleeding-Out

A sample plate with 6 cm (width)×6 cm (length)×0.3 cm (thickness) was prepared by using a film gate, and allowed to stand at a temperature of 40° C. and a humidity of 90% for 7 days. The state during that period was visually observed, and evaluated based on the following criteria:

⊚: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

EXAMPLES 1 TO 9 AND COMPARATIVE EXAMPLE 1

Compounds compounded with a preliminary mixer based on compounding formulations of Tables 1 or 3 were each turned into a pellet form to prepare antistatic polyamide elastomer compositions, which were evaluated. In Examples 4 to 6, the hazard can be avoided by the use in combination with component (C), so that the workability is excellent and the volume resistivity can be adjusted low.

As for a method for preparing kneaded pelletized compositions, the antistatic polyamide elastomer compositions were each melt mixed with a 47 mm twin-screw extruder of which screws rotates in the same direction at 190° C. Each strand-like melt mixture extruded from a die was cooled in a water bath, and passed through a cutter to prepare pellets of the antistatic polyamide elastomer composition. Results are shown in the following tables.

EXAMPLES 10 TO 16 AND COMPARATIVE EXAMPLE 2

Directly formable antistatic polyamide elastomer compositions were prepared by dry blending based on compounding formulations of Table 2 or 3, and evaluated.

As for the dry-blended directly formable compositions, components (A) to (C) were compounded, mixed and preliminarily dry blended in a tumbler mixer to prepare the directly formable antistatic polyamide elastomer compositions. Results are shown in the following tables.

TABLE 1

| Example | 1 | 2 | 3 | 4 | 5 | 6 | 7 | 8 | 9 |
|---|---|---|---|---|---|---|---|---|---|
| Compounding Formulation (parts) | | | | | | | | | |
| Polyamide Elastomer (A-1) | 100 | 100 | 100 | 100 | 100 | 100 | 100 | 100 | 100 |
| Component (B); (B-1) | 0.18 | 0.54 | 0.9 | 0 | 0 | 0 | 0 | 0 | 0 |
| Solution [(B-2) + (C-1)] (18) | 0 | 0 | 0 | 1(0.18 + 0.82) | 3(0.54 + 2.46) | 5(0.9 + 4.1) | 0 | 0 | 0 |
| Solution [(B-3) + (P)] | 0 | 0 | 0 | 0 | 0 | 0 | 1(0.36 + 0.64) | 3(1.08 + 1.92) | 5(1.8 + 3.2) |
| Results of Evaluation | | | | | | | | | |
| Tensile Strength (MPa) | 30 | 28 | 26 | 30 | 28 | 26 | 30 | 28 | 25 |
| Elongation (%) | 700 | 710 | 730 | 700 | 710 | 730 | 700 | 710 | 730 |
| Volume Resistivity (Ω · cm) | 1 × 10$^9$~ 3 × 10$^9$ | 8 × 10$^7$~ 1 × 10$^8$ | 5 × 10$^7$~ 8 × 10$^7$ | 2 × 10$^8$~ 3 × 10$^8$ | 3 × 10$^7$~ 5 × 10$^7$ | 1 × 10$^7$~ 2 × 10$^7$ | 2 × 10$^8$~ 3 × 10$^8$ | 4 × 10$^7$~ 5 × 10$^7$ | 1 × 10$^7$~ 2 × 10$^7$ |
| Bleeding-out (After) | | | | | | | | | |
| 24 hrs | ⊚ | ⊚ | ⊚ | ⊚ | ⊚ | ⊚ | ○ | ○ | Δ |
| 48 hrs | ⊚ | ⊚ | ⊚ | ⊚ | ⊚ | ⊚ | ○ | Δ | Δ |
| 120 hrs | ⊚ | ⊚ | ⊚ | ⊚ | ⊚ | ○ | Δ | Δ | Δ |
| 168 hrs | ⊚ | ⊚ | ⊚ | ⊚ | ⊚ | ○ | Δ | Δ | Δ |

TABLE 2

| Example | 10 | 11 | 12 | 13 | 14 | 15 | 16 |
|---|---|---|---|---|---|---|---|
| Compounding Formulation (parts) | | | | | | | |
| Polyamide Elastomer (A-1) | 100 | 100 | 100 | 100 | 100 | 100 | 100 |
| Component (B); (B-1) | 0.18 | 0.54 | 0.9 | 0 | 0 | 0 | 0 |
| Solution [(B-2) + (C-1)] (18) | 0 | 0 | 0 | 1(0.18 + 0.82) | 3(0.54 + 2.46) | 5(0.9 + 4.1) | 0 |
| Solution [(B-3) + (P)] | 0 | 0 | 0 | 0 | 0 | 0 | 1(0.36 + 0.64) |
| Results of Evaluation | | | | | | | |
| Tensile Strength (MPa) | 31 | 30 | 29 | 31 | 30 | 29 | 31 |
| Elongation (%) | 700 | 700 | 710 | 700 | 700 | 710 | 700 |
| Volume Resistivity ($\Omega \cdot$ cm) | $3 \times 10^9 \sim 5 \times 10^9$ | $1 \times 10^8 \sim 5 \times 10^8$ | $6 \times 10^7 \sim 8 \times 10^7$ | $1 \times 10^8 \sim 3 \times 10^8$ | $2 \times 10^7 \sim 3 \times 10^7$ | $1 \times 10^7 \sim 2 \times 10^7$ | $2 \times 10^8 \sim 3 \times 10^8$ |
| Bleeding-out (After) | | | | | | | |
| 24 hrs | ◎ | ◎ | ◎ | ◎ | ◎ | ◎ | ○ |
| 48 hrs | ◎ | ◎ | ◎ | ◎ | ◎ | ◎ | ○ |
| 120 hrs | ◎ | ◎ | ◎ | ◎ | ◎ | ○ | Δ |
| 168 hrs | ◎ | ◎ | ◎ | ○ | ○ | ○ | Δ |

TABLE 3

| Comparative Example | 1 | 2 |
|---|---|---|
| Compounding Formulation (parts) | | |
| Polyamide Elastomer; (A-1) | 100 | 100 |
| Component (B); (B-1) | 0 | 0 |
| Solution [(B-2) + (C-1)] (18) | 0 | 0 |
| (Q-1) | 3 | 3 |
| Forming Method | Formed after pelletizing | Directly formed by dry blending |
| Results of Evaluation | | |
| Tensile Strength (MPa) | 11 | 11 |
| Elongation (%) | 800 | 800 |
| Volume Resistivity ($\Omega \cdot$ cm) | $1 \times 10^{12} \sim 6 \times 10^{12}$ | $8 \times 10^{11} \sim 4 \times 10^{12}$ |
| Bleeding-out (After) | | |
| 24 hrs | Δ | Δ |
| 48 hrs | X | X |
| 120 hrs | X | X |
| 168 hrs | X | X |

From the examples of the above tables, the physical properties such as the tensile strength and elongation were not impaired, the conductive materials hardly bled out, and the electric resistivity and formability were good, for all the compositions of the present invention. On the other hand, Comparative Examples 1 and 2 of Table 3 were unsuitable for the purpose of the present invention, because the conductive materials easily bled out and the electric resistivity was also high.

Second Composition

Various types of components used in examples and comparative examples are as follows:

Method for Preparing Samples

3020 manufactured by SHOWA HIGHPOLYMER CO., LTD. (D-1) having a melt flow rate (MFR) value of 19.5 to 29.4 g/10 minutes was used as aliphatic polyester resin (D).

$LiClO_4$ (B-2) and $NaClO_4$ (B-3) were each used as metal salt (B), and dissolved in an amount of 25 parts based on 100 parts of dibutoxyethoxyethyl adipate (C-1) to obtain metal salt-compound mixtures [(B-2)+(C-1)] (25) and [(B-3)+(C-1)] (20), respectively.

Methods for Evaluating Physical Properties

The physical properties were measured in accordance with the ASTM Standards. Molding was conducted by injection molding, using an injection molding machine of a mold clamping pressure of 80 tons/cm$^2$, setting the cylinder temperature to 100 to 130° C. and the mold temperature to 30° C. The molded test piece was controlled at 25° C. at 50% RH for 24 hours, and measurements were made in accordance with the following standards.

Measurements were each made according to ASTM D638 using No. 1 test piece for the tensile test, according to ASTM D792 using a ¼ in. test piece for the bending test, according to ASTM D648 using a ¼-in, thick test piece at a low load for the thermal deformation test, according to ASTM D792 for the specific gravity, and according to ASTM D1238 at 220° C. for the melt flow rate (MFR).

Methods for Evaluating Antistatic Properties

Using HIRESTA measuring (machine name) manufactured by Mitsubishi Chemical Corporation, measurements were made by the constant voltage method at an applied voltage of 500 V according to ASTM D257. As a test piece, a 6×6×0.3-cm injection molded plate was used. Immediately after molding, it was allowed to stand in a desiccator maintained at an environmental temperature of 25° C.±2° C. and a relative humidity of 20% or less for 24 hours, and then the surface resistivity and the volume resistivity were measured (before moisture conditioning). Then, similar measurements were made for the sample allowed to stand at an environmental temperature of 25° C.±2° C. and a relative humidity of 50% RH for 24 hours (after moisture conditioning).

Using the ASTM D638 No. 1 tensile test piece allowed to stand at an environmental temperature of 25° C.±2° C. and a relative humidity of 50% RH for 24 hours, the surface resistivity of a dumbbell-drawn portion after the test piece was drawn 3 times was measured (after moisture conditioning and dumbbell drawing).

Surface Appearance of Formed Article

The surface appearance of a 6×6×0.3-cm injection molded plate similar to the above-mentioned test piece was visually observed to evaluate sink marks, lumpy and flashing.

Method for Evaluating Biodegradability

Natural environment water (river water) to which aqueous inorganic salt solution A ($KH_2PO_4$; 8.50 g/liter, $K_2HPO_4$; 21.75 g/liter, $Na_2HPO_4.H_2O$; 33.30 g/liter, $NH_4Cl$; 1.70 g/liter), aqueous inorganic salt solution (B) ($MgSO_4.7H_2O$; 22.50 g/liter), aqueous inorganic salt solution (C) ($CaCl_2$; 27.50 g/liter) and aqueous inorganic salt solution (D) ($FeCl_3.6H_2O$; 0.25 g/liter) were each added in an amount of 0.1%, and a 200 μm thick test sample film were put in a glass culture flask equipped with a buret. A sample preparation solution in the above-mentioned culture flask was cultured at 25° C. under aerobic conditions, and the biochemical oxygen demand (BOD) after 28 days was determined, using a BOD measuring device. Based on the BOD value, the decomposition rate (%) was determined by the following equation:

Decomposition rate (%)=[{(the BOD value of a culture solution for a subject material)−(the BOD value of a culture solution for a biological blank test)}/the theoretical oxygen demand]×100

EXAMPLES 17 TO 21

Dibutoxyethoxyethyl adipate/$LiClO_4$ mixture [(B-2)+(C-1)] (20) was added in amounts of 0.5, 1.0, 3.0, 5.0 and 10 parts, respectively, based on 100 parts of aliphatic polyester resin (D-1), and mixed using a tumbler mixer.

Melt kneading was conducted, using a twin-screw extruder having a screw diameter of 20 mm, of which screws rotates in the opposite directions, as a melt kneader, and setting the cylinder temperature to 130° C. The resin melted was extruded in a strand form, cooled by water cooling, and then fed to a pelletizer to prepare pellets. Results are shown in the following table.

EXAMPLES 22 AND 23

Lithium perchlorate ($LiClO_4$) (B-2) was directly mixed with aliphatic polyester (D-1), followed by forming. Results are shown in the following table.

EXAMPLES 24 TO 26

Dibutoxyethoxyethyl adipate/$LiClO_4$ mixture [(B-2)+(C-1)] (20) was dry blended in amounts of 0.5, 3.0 and 10 parts, respectively, based on 100 parts of aliphatic polyester resin (D-1), to prepare powdery compositions, which were mixed using a tumbler mixer and directly melt formed with an injection forming machine. Results are shown in the following table.

EXAMPLES 27 TO 31

Using sodium perchlorate ($NaClO_4$) (B-3), pellets were prepared by melt kneading in the same manner as described above, and formed. Results are shown in the following table.

EXAMPLES 32 AND 33

Sodium perchlorate ($NaClO_4$) (B-3) was directly mixed with aliphatic polyester (D-1), and the mixture was formed. Results are shown in the following table.

EXAMPLES 34 TO 36

Dry blending was conducted in the same manner as described above to obtain powdery compositions, which were directly formed. Results are shown in the following table.

COMPARATIVE EXAMPLES 3 TO 7

In Example 17 to 21, conductive fillers [Ketchen Black EC (trade name) (R-1) manufactured by LION CORPORATION and Denka Black (trade name, acetylene carbon black) (R-2) manufactured by DENKI KAGAKU KOGYO KABUSHIKI KAISHA] were each used in place of the metal salt-compound mixture. Results are shown in the following table.

TABLE 4

| Example | 17 | 18 | 19 | 20 | 21 |
|---|---|---|---|---|---|
| Compounding Formulation (parts) | | | | | |
| Aliphatic Polyester (D-1) | 100 | 100 | 100 | 100 | 100 |
| Dibutoxyethoxyethyl Adipate (C-1) | 0.4 | 0.8 | 2.4 | 4.0 | 8 |
| $LiClO_4$ (B-2) | 0.1 | 0.2 | 0.6 | 1 | 2 |
| Results of Evaluation | | | | | |
| Tensile Strength (Yield Point) (MPa) | 20 | 19 | 19 | 18 | 15 |
| Bending Strength (MPa) | 320 | 320 | 290 | 260 | 210 |
| Thermal Deformation Temperature (° C.) | 77 | 77 | 75 | 74 | 71 |
| Surface Resistivity (Ω/sq.) | | | | | |
| Before moisture conditioning | $3 \times 10^{11}$ | $1 \times 10^{11}$ | $2 \times 10^{10}$ | $5 \times 10^9$ | $1 \times 10^9$ |
| After moisture conditioning (24 hrs) | $1 \times 10^{11}$ | $6 \times 10^{10}$ | $7 \times 10^9$ | $1 \times 10^9$ | $4 \times 10^8$ |

TABLE 4-continued

| Example | 17 | 18 | 19 | 20 | 21 |
|---|---|---|---|---|---|
| After moisture conditioning and dumbbell drawing Volume Resistance Value (Ω·cm) | $6 \times 10^{11}$ | $2 \times 10^{11}$ | $1 \times 10^{10}$ | $3 \times 10^{9}$ | $9 \times 10^{8}$ |
| Before moisture conditioning | $2 \times 10^{10}$ | $1 \times 10^{10}$ | $1 \times 10^{9}$ | $4 \times 10^{8}$ | $7 \times 10^{7}$ |
| After moisture conditioning (24 hrs) | $1 \times 10^{10}$ | $7 \times 10^{9}$ | $6 \times 10^{8}$ | $1 \times 10^{8}$ | $4 \times 10^{7}$ |
| MFR (180° C., g/10 min.) | 22 | 25 | 30 | 35 | 50 |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 5

| Example | 22 | 23 | 24 | 25 | 26 |
|---|---|---|---|---|---|
| Compounding Formulation (parts) | | | | | |
| Aliphatic Polyester (D-1) | 100 | 100 | 100 | 100 | 100 |
| Dibutoxyethoxyethyl Adipate (C-1) | — | — | 0.4 | 2.4 | 8 |
| LiClO$_4$ (B-2) | 0.1 | 2 | 0.1 | 0.6 | 2 |
| Results of Evaluation | | | | | |
| Tensile Strength (Yield Point) (MPa) | 20 | 19 | 20 | 19 | 16 |
| Bending Strength (MPa) | 340 | 340 | 330 | 300 | 220 |
| Thermal Deformation Temperature (° C.) | 77 | 77 | 77 | 75 | 71 |
| Surface Resistivity (Ω/sq.) | | | | | |
| Before moisture conditioning | $8 \times 10^{11}$ | $3 \times 10^{10}$ | $2 \times 10^{11}$ | $3 \times 10^{10}$ | $2 \times 10^{9}$ |
| After moisture conditioning (24 hrs) | $8 \times 10^{11}$ | $3 \times 10^{9}$ | $2 \times 10^{11}$ | $6 \times 10^{9}$ | $5 \times 10^{8}$ |
| After moisture conditioning and dumbbell drawing Volume Resistance Value (Ω·cm) | $8 \times 10^{11}$ | $7 \times 10^{9}$ | $5 \times 10^{11}$ | $1 \times 10^{10}$ | $9 \times 10^{8}$ |
| Before moisture conditioning | $7 \times 10^{10}$ | $7 \times 10^{8}$ | $3 \times 10^{10}$ | $2 \times 10^{9}$ | $8 \times 10^{7}$ |
| After moisture conditioning (24 hrs) | $7 \times 10^{10}$ | $8 \times 10^{8}$ | $2 \times 10^{10}$ | $5 \times 10^{8}$ | $6 \times 10^{7}$ |
| MFR (180° C., g/10 min.) | 15 | 40 | — | — | — |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 6

| Example | 27 | 28 | 29 | 30 | 31 |
|---|---|---|---|---|---|
| Compounding Formulation (parts) | | | | | |
| Aliphatic Polyester (D-1) | 100 | 100 | 100 | 100 | 100 |
| Dibutoxyethoxyethyl Adipate (C-1) | 0.4 | 0.8 | 2.4 | 4.0 | 8 |
| NaClO$_4$ (B-3) | 0.1 | 0.2 | 0.6 | 1 | 2 |
| Results of Evaluation | | | | | |
| Tensile Strength (Yield Point) (MPa) | 20 | 19 | 19 | 18 | 15 |
| Bending Strength (MPa) | 320 | 330 | 290 | 265 | 215 |
| Thermal Deformation Temperature (° C.) | 77 | 77 | 75 | 74 | 72 |
| Surface Resistivity (Ω/sq.) | | | | | |
| Before moisture conditioning | $5 \times 10^{11}$ | $2 \times 10^{11}$ | $4 \times 10^{10}$ | $7 \times 10^{9}$ | $4 \times 10^{9}$ |
| After moisture conditioning (24 hrs) | $2 \times 10^{11}$ | $7 \times 10^{10}$ | $9 \times 10^{9}$ | $3 \times 10^{9}$ | $6 \times 10^{8}$ |
| After moisture conditioning and dumbbell drawing | $8 \times 10^{11}$ | $4 \times 10^{11}$ | $3 \times 10^{10}$ | $5 \times 10^{9}$ | $4 \times 10^{9}$ |
| Volume Resistance Value (Ω · cm) | | | | | |
| Before moisture conditioning | $3 \times 10^{10}$ | $3 \times 10^{10}$ | $4 \times 10^{9}$ | $6 \times 10^{8}$ | $9 \times 10^{7}$ |
| After moisture conditioning (24 hrs) | $2 \times 10^{10}$ | $9 \times 10^{9}$ | $8 \times 10^{8}$ | $3 \times 10^{8}$ | $8 \times 10^{7}$ |
| MFR (180° C., g/10 min.) | 23 | 26 | 31 | 37 | 52 |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 7

| Example | 32 | 33 | 34 | 35 | 36 |
|---|---|---|---|---|---|
| Compounding Formulation (parts) | | | | | |
| Aliphatic Polyester (D-1) | 100 | 100 | 100 | 100 | 100 |
| Dibutoxyethoxyethyl Adipate (C-1) | — | — | 0.4 | 2.4 | 8 |
| NaClO$_4$ (B-3) | 0.1 | 2 | 0.1 | 0.6 | 2 |
| Results of Evaluation | | | | | |
| Tensile Strength (Yield Point) (MPa) | 20 | 20 | 20 | 19 | 17 |
| Bending Strength (MPa) | 340 | 340 | 335 | 310 | 220 |
| Thermal Deformation Temperature (° C.) | 77 | 77 | 77 | 75 | 71 |
| Surface Resistivity (Ω/sq.) | | | | | |
| Before moisture conditioning | $9 \times 10^{11}$ | $5 \times 10^{10}$ | $4 \times 10^{11}$ | $5 \times 10^{10}$ | $4 \times 10^{9}$ |
| After moisture conditioning (24 hrs) | $9 \times 10^{11}$ | $5 \times 10^{9}$ | $5 \times 10^{11}$ | $8 \times 10^{9}$ | $7 \times 10^{8}$ |
| After moisture conditioning and dumbbell drawing | $9 \times 10^{11}$ | $9 \times 10^{9}$ | $7 \times 10^{11}$ | $4 \times 10^{10}$ | $2 \times 10^{9}$ |

TABLE 7-continued

| Example | 32 | 33 | 34 | 35 | 36 |
|---|---|---|---|---|---|
| Volume Resistance Value (Ω·cm) | | | | | |
| Before moisture conditioning | $8 \times 10^{10}$ | $9 \times 10^8$ | $5 \times 10^{10}$ | $5 \times 10^9$ | $1 \times 10^8$ |
| After moisture conditioning (24 hrs) | $9 \times 10^{10}$ | $2 \times 10^9$ | $5 \times 10^{10}$ | $8 \times 10^8$ | $8 \times 10^7$ |
| MFR (180° C., g/10 min.) | 18 | 45 | — | — | — |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 8

| Comparative Example | 3 | 4 | 5 |
|---|---|---|---|
| Compounding Formulation (parts) | | | |
| Aliphatic Polyester (D-1) | 100 | 100 | 100 |
| Dibutoxyethoxyethyl Adipate (C-1) | — | — | — |
| LiClO$_4$ (B-2) | — | — | — |
| Carbon Black (R-1) | — | 5 | 10 |
| Carbon Black (R-2) | — | — | — |
| Results of Evaluation | | | |
| Tensile Strength (Yield Point) (MPa) | 20 | 22 | 23 |
| Bending Strength (MPa) | 340 | 360 | 380 |
| Thermal Deformation Temperature (° C.) | 77 | 78 | 79 |
| Surface Resistivity (Ω/sq.) | | | |
| Before moisture conditioning | $10^{14}$ | $10^9 \sim 10^{11}$ | $10^5 \sim 10^6$ |
| After moisture conditioning (24 hrs) | $10^{14}$ | $10^9 \sim 10^{11}$ | $10^5 \sim 10^6$ |
| After moisture conditioning and dumbbell drawing | $3 \times 10^{14}$ | Conductivity was not measured | $10^{12}$ or more with wide variation |
| Volume Resistance Value (Ω·cm) | | | |
| Before moisture conditioning | $10^{14}$ | $10^9 \sim 10^{10}$ | $10^4 \sim 10^5$ |
| After moisture conditioning (24 hrs) | $10^{14}$ | $10^9 \sim 10^{10}$ | $10^4 \sim 10^5$ |
| MFR (180° C., g/10 min.) | 20 | 13 | 5 |
| Surface Appearance of Formed Article | Good | Lumpy | Lumpy |
| Bleeding-out | Nil | Nil | Nil |
| Biodegradability (after 28 days, %) | 60 or more | 35 | 20 |

TABLE 9

| Comparative Example | 6 | 7 |
|---|---|---|
| Compounding Formulation (parts) | | |
| Aliphatic Polyester (D-1) | 100 | 100 |
| Dibutoxyethoxyethyl Adipate (C-1) | — | — |
| LiClO$_4$ (B-2) | — | — |
| Carbon Black (R-1) | — | — |
| Carbon Black (R-2) | 15 | 23 |
| Results of Evaluation | | |
| Tensile Strength (Yield Point) (MPa) | 19 | 19 |
| Bending Strength (MPa) | 320 | 290 |
| Thermal Deformation Temperature (° C.) | 77 | 75 |
| Surface Resistivity (Ω/sq.) | | |
| Before moisture conditioning | $10^8 \sim 10^{10}$ | $10^5 \sim 10^6$ |
| After moisture conditioning (24 hrs) | $10^8 \sim 10^{10}$ | $10^5 \sim 10^6$ |
| After moisture conditioning and dumbbell drawing | $10^{12}$ or more | $10^8 \sim 10^{12}$ |
| Volume Resistance Value (Ω·cm) | | |
| Before moisture conditioning | $10^7 \sim 10^9$ | $10^4 \sim 10^5$ |
| After moisture conditioning (24 hrs) | $10^7 \sim 10^9$ with wide variation | $10^4 \sim 10^5$ with wide variation |
| MRF (180° C., g/10 min.) | 10 | 4 |
| Surface Appearance of Formed Article | Good | Flashing |
| Bleeding-out | Nil | Nil |
| Biodegradability (after 28 days, %) | 30 | 20 |

Component (D);

(D-2): A polyether/polyester-based thermoplastic polyester elastomer resin (PELPRENE P-40B (trade name) manufactured by TOYOBO CO., LTD., hardness D=31).

(D-3): A polyether/polyester-based thermoplastic polyester elastomer resin (PELPRENE P-280B (trade name) manufactured by TOYOBO CO., LTD., hardness D=68).

(B-1): Bis(trifluoromethanesulfonyl)imidolithium [(CF$_3$SO$_2$)$_2$Nli]

[(B-1)+(C-1)] (20):

Sankonol 0862-20R (trade name) manufactured by Sanko Chemical Industry CO., Ltd. was used in which (B-1) was dissolved in dibutoxyethoxyethyl adipate (C-1) in an amount of 20%.

As a comparative example, was used "MP100" (trade name) [(B-3)+(P)] manufactured by Akishima Chemical Industries CO., Ltd. described above.

As comparative examples, there was used "RIKEMAL S-100" (trade name) (low-molecular type hydrophilic surfactant, glycerol monostearate) (Q-1) manufactured by Riken Vitamin Co., Ltd.

As the conductive filler (carbon black), there was used "NITERON #10" (trade name) (furnace black) (R-3) manufactured by Nippon Steel Chemical Co., Ltd.

Preparation of Test Pieces

Each test piece was molded from sample pellets with an injection molding machine of a mold clamping pressure of 80 tons/cm$^2$. For the molding conditions, the cylinder temperature was 220° C. and the mold temperature was 40° C.

Measurements of Physical Properties

After the test piece was controlled at 23±2° C. and a relative humidity of 50% RH for 24 hours, measurements of the following physical properties were made.

The surface hardness was determined according to ASTM D2240. Measurements were each made according to ASTM D638 for the tensile strength and elongation, and according to ASTM D1238 at 230° C. at 2,160 g for the melt flow rate.

Volume Resistivity (Conductivity)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity between both the electrodes was determined. The unit in the following tables is Ω·cm.

Coloring Properties

Using organic pigments, inorganic pigments and the like, one which was colorable to basic colors (red, green, yellow, white and blue) was evaluated as good.

EXAMPLES 37 TO 47 AND COMPARATIVE EXAMPLES 8 TO 17

Based on compounding formulations of the following tables, antistatic polyester elastomer compositions were prepared and evaluated.

Pelletized compositions (compounds) obtained by melt kneading were each prepared by melt mixing the above-mentioned components and other components with a 47 mm twin-screw extruder of which screws rotates in the same direction at 220° C., cooling a strand-like melt composition extruded from a die in a water bath, and passing it through a cutter. For the conductive materials used in the above-mentioned comparative examples, compounds were also similarly prepared.

Further, directly formable antistatic compositions obtained by dry blending were prepared by compounding, mixing and preliminarily dry blending the components in a tumbler mixer. For the conductive materials used in the above-mentioned comparative examples, compounds were also similarly prepared.

Results are shown in the following tables.

TABLE 10

| Example | 37 | 38 | 39 | 40 | 41 |
|---|---|---|---|---|---|
| Compounding Formulation (parts) | | | | | |
| (D-2) Hardness D = 31 | 100 | 100 | 0 | 0 | 100 |
| (D-3) Hardness D = 68 | 0 | 0 | 100 | 100 | 0 |
| [(B-1) + (C-1)] * 1 | 0 | 0 | 0 | 0 | 1 |
| (B) *2 | 0.2 | 1.0 | 0.2 | 1.0 | (0.2) |
| Results of Evaluation of Article Formed after Pelletizing | | | | | |
| Hardness D | 32 | 31 | 69 | 68 | 31 |
| Tensile Strength (MPa) | 14 | 13 | 37 | 33 | 13 |
| Elongation (%) | 800 | 820 | 510 | 520 | 820 |
| Volume Resistivity (Ω · cm) | 2 × 10$^8$~3 × 10$^8$ | 6 × 10$^7$~8 × 10$^8$ | 6 × 10$^8$~8 × 10$^8$ | 8 × 10$^7$~1 × 10$^8$ | 2 × 10$^7$~3 × 10$^7$ |
| Bleeding-out (after) | | | | | |
| 24 hrs | ◉ | ◉ | ◉ | ◉ | ◉ |
| 48 hrs | ◉ | ◉ | ◉ | ◉ | ◉ |
| 120 hrs | ◉ | ◉ | ◉ | ◉ | ◉ |
| 168 hrs | ◉ | ◉ | ◉ | ◉ | ◉ |
| Coloring Properties | Good | Good | Good | Good | Good |
| Results of Evaluation of Article Directly Formed by Dry Blending | | | | | |
| Hardness D | 32 | 31 | 68 | 68 | 30 |
| Tensile Strength (MPa) | 14 | 13 | 38 | 38 | 13 |
| Elongation (%) | 800 | 820 | 500 | 490 | 830 |
| Volume Resistivity (Ω · cm) | 2 × 10$^8$~3 × 10$^8$ | 6 × 10$^7$~8 × 10$^8$ | 6 × 10$^8$~8 × 10$^8$ | 8 × 10$^7$~1 × 10$^8$ | 1 × 10$^7$~2 × 10$^7$ |
| Bleeding-out (after) | | | | | |
| 24 hrs | ◉ | ◉ | ◉ | ◉ | ◉ |
| 48 hrs | ◉ | ◉ | ◉ | ◉ | ◉ |
| 120 hrs | ◉ | ◉ | ◉ | ◉ | ◉ |
| 168 hrs | ◉ | ◉ | ◉ | ◉ | ◉ |
| Coloring Properties | Good | Good | Good | Good | Good |

TABLE 11

| Example | 42 | 43 | 44 | 45 | 46 |
|---|---|---|---|---|---|
| Compounding Formulation (parts) | | | | | |
| (D-2) Hardness D = 31 | 100 | 100 | 0 | 0 | 0 |
| (D-3) Hardness D = 68 | 0 | 0 | 100 | 100 | 100 |
| [(B-1) + (C-1)] *1 | 3 | 5 | 1 | 3 | 5 |
| (B) *2 | (0.6) | (1.0) | (0.2) | (0.6) | (1.0) |
| Results of Evaluation of Article Formed after Pelletizing | | | | | |
| Hardness D | 30 | 28 | 68 | 67 | 66 |
| Tensile Strength (MPa) | 12 | 11 | 36 | 34 | 30 |
| Elongation (%) | 830 | 850 | 520 | 550 | 870 |
| Volume Resistivity ($\Omega \cdot$ cm) | $8 \times 10^6 \sim 1 \times 10^7$ | $6 \times 10^6 \sim 8 \times 10^6$ | $5 \times 10^7 \sim 8 \times 10^7$ | $2 \times 10^7 \sim 3 \times 10^7$ | $8 \times 10^6 \sim 1 \times 10^7$ |
| Bleeding-out (after) | | | | | |
| 24 hrs | ⊚ | ⊚ | ⊚ | ⊚ | ○ |
| 48 hrs | ⊚ | ⊚ | ⊚ | ⊚ | ○ |
| 120 hrs | ⊚ | ○ | ⊚ | ⊚ | ○ |
| 168 hrs | ⊚ | ○ | ⊚ | ⊚ | ○ |
| Coloring Properties | Good | Good | Good | Good | Good |
| Results of Evaluation of Article Directly Formed by Dry Blending | | | | | |
| Hardness D | 29 | 27 | 68 | 67 | 66 |
| Tensile Strength (MPa) | 12 | 11 | 37 | 35 | 33 |
| Elongation (%) | 840 | 860 | 510 | 530 | 550 |
| Volume Resistivity ($\Omega \cdot$ cm) | $6 \times 10^6 \sim 8 \times 10^6$ | $4 \times 10^6 \sim 6 \times 10^6$ | $2 \times 10^7 \sim 4 \times 10^7$ | $7 \times 10^6 \sim 1 \times 10^7$ | $7 \times 10^6 \sim 1 \times 10^7$ |
| Bleeding-out (after) | | | | | |
| 24 hrs | ⊚ | ⊚ | ⊚ | ⊚ | ○ |
| 48 hrs | ⊚ | ○ | ⊚ | ⊚ | ○ |
| 120 hrs | ⊚ | ○ | ⊚ | ○ | ○ |
| 168 hrs | ○ | ○ | ⊚ | ○ | ○ |
| Coloring Properties | Good | Good | Good | Good | Good |

TABLE 12

| | Comparative Example 8 | Comparative Example 9 | Example 47 |
|---|---|---|---|
| Compounding Ratio (parts) | | | |
| (D-2) Hardness D = 31 | 100 | 0 | 100 |
| (D-3) Hardness D = 68 | 0 | 100 | 0 |
| [(B-1) + (C-1)] *1 | 0 | 0 | 0 |
| (B) *2 | 0 | 0 | 0 |
| [(B-3) + (P)] | 0 | 0 | 1 |
| (Q-1) | 0 | 0 | 0 |
| (R-3) | 0 | 0 | 0 |
| Results of Evaluation of Article Formed after Pelletizing | | | |
| Hardness D | 31 | 68 | 31 |
| Tensile Strength (MPa) | 14 | 38 | 13 |
| Elongation (%) | 800 | 500 | 820 |
| Volume Resistivity ($\Omega \cdot$ cm) | $1 \times 10^{13}$ or more | $1 \times 10^{14}$ or more | $2 \times 10^{11} \sim 4 \times 10^{11}$ |
| Bleeding-out (after) | | | |
| 24 hrs | ⊚ | ⊚ | ○ |
| 48 hrs | ⊚ | ⊚ | ○ |
| 120 hrs | ⊚ | ⊚ | △ |
| 168 hrs | ⊚ | ⊚ | △ |
| Coloring Properties | Good | Good | Good |
| Results of Evaluation of Article Directly Formed by Dry Blending | | | |
| Hardness D | 31 | 68 | 30 |
| Tensile Strength (MPa) | 14 | 39 | 12 |
| Elongation (%) | 810 | 500 | 810 |
| Volume Resistivity ($\Omega \cdot$ cm) | $1 \times 10^{13}$ or more | $1 \times 10^{14}$ or more | $1 \times 10^{11} \sim 3 \times 10^{11}$ |
| Bleeding-out (after) | | | |
| 24 hrs | ⊚ | ⊚ | ○ |
| 48 hrs | ⊚ | ⊚ | ○ |
| 120 hrs | ⊚ | ⊚ | △ |
| 168 hrs | ⊚ | ⊚ | △ |
| Coloring Properties | Good | Good | Good |

TABLE 13

| Comparative Example | 10 | 11 | 12 | 13 |
|---|---|---|---|---|
| Compounding Ratio (parts) | | | | |
| (D-2) Hardness D = 31 | 100 | 0 | 100 | 0 |
| (D-3) Hardness D = 68 | 0 | 100 | 0 | 100 |
| [(B-1) + (C-1)] *1 | 0 | 0 | 0 | 0 |
| (B) *2 | 0 | 0 | 0 | 0 |
| [(B-3) + (P)] | 0 | 0 | 0 | 0 |
| (Q-1) | 0 | 0 | 3 | 3 |
| (R-3) | 20 | 25 | 0 | 0 |
| Results of Evaluation of Article Formed after Pelletizing | | | | |
| Hardness D | 41 | 80 | 30 | 67 |
| Tensile Strength (MPa) | 26 | 25 | 11 | 34 |
| Elongation (%) | 310 | 185 | 800 | 540 |
| Volume Resistivity ($\Omega \cdot cm$) | $4 \times 10^7 \sim 5 \times 10^7$ | $1 \times 10^5 \sim 2 \times 10^5$ | $1 \times 10^{12} \sim 6 \times 10^{12}$ | $1 \times 10^{12} \sim 5 \times 10^{12}$ |
| Bleeding-out (after) | | | | |
| 24 hrs | ⊚ | ⊚ | Δ | Δ |
| 48 hrs | ⊚ | ⊚ | X | X |
| 120 hrs | ⊚ | ⊚ | X | X |
| 168 hrs | ⊚ | ⊚ | X | X |
| Coloring Properties | Bad only black | Bad only black | Good | Good |
| Others | | Cracks were developed in an article in cold | | |

TABLE 14

| Comparative Example | 14 | 15 | 16 | 17 |
|---|---|---|---|---|
| Compounding Ratio (parts) | | | | |
| (D-2) Hardness D = 31 | 100 | 0 | 100 | 0 |
| (D-3) Hardness D = 68 | 0 | 100 | 0 | 100 |
| [(B-1) + (C-1)] *1 | 0 | 0 | 0 | 0 |
| (B) *2 | 0 | 0 | 0 | 0 |
| [(B-3) + (P)] | 0 | 0 | 0 | 0 |
| (Q-1) | 0 | 0 | 3 | 3 |
| (R-3) | 20 | 25 | 0 | 0 |
| Results of Evaluation of Article Directly Formed by Dry Blending | | | | |
| Hardness D | — | — | 30 | 66 |
| Tensile Strength (MPa) | — | — | 11 | 31 |
| Elongation (%) | — | — | 800 | 520 |
| Volume Resistivity ($\Omega \cdot cm$) | — | — | $8 \times 10^{11} \sim 4 \times 10^{12}$ | $7 \times 10^{11} \sim 3 \times 10^{12}$ |
| Bleeding-out (after) | | | | |
| 24 hrs | — | — | Δ | Δ |
| 48 hrs | — | — | X | X |
| 120 hrs | — | — | X | X |
| 168 hrs | — | — | X | X |
| Coloring Properties | Unable to test | Unable to test | Good | Good |
| Others | because of impossibility of forming | because of impossibility of forming | | |

*1 [(B-1) + (C-1)] indicates "Sankonol 0862-20R" (trade name) described above.
*2 (B) indicates bis(trifluoro-methanesulfonyl)imidolithium, and numerals with brackets indicate the amount of component (B-1) contained in "Sankonol 0862-20R" (trade name).

Third Composition

Various types of components used in examples and comparative examples were as follows:

Method for Preparing Samples

LACTY 9400 (JIS K-7210, MFR: 5 g/10 min, 190° C., at a load of 2,160 g) manufactured by SHIMADZU CORPORATION was used as polylactic acid-based resin (E-1), Glycerol monocapryl diacetyl (Rikemal PLOO9 manufactured by Riken Vitamin Co., Ltd.) (Q-2) and dibutoxyethoxyethyl adipate (Sankonol 0862 manufactured by Sanko Chemical Industry CO., Ltd.) (C-1) were used as plasticizer (F).

Li.CiO$_4$ (B-2) and Li.N(CF$_3$SO$_2$)$_2$ (B-1) were used as metal salt (B),

Methods for Preparing Formed Articles (Test Pieces)

<Injection Molding Processing>

Injection molding was conducted using an injection molding machine of a mold clamping pressure of 80 tons/cm$^2$, at a set cylinder temperature of 100 to 170° C. and at a set mold temperature of 30° C.

<Extrusion Molding Processing>

Extrusion molding was conducted using a 20 mm single-screw extruder at a set cylinder temperature of 100 to 170° C., and using a tape-shaped die at a screw rotation speed of 10 rpm.

The antistatic properties were evaluated in the same manner as described above.

Evaluation of Transparency

The transparency was evaluated using a 3 mm thick extrusion molded article. Evaluation criteria are as follows:

Transparent: When a story of a newspaper placed under three sheets of the 3 mm thick extrusion molded articles was clearly read;

Opaque: When it was difficult to read a story of a newspaper placed under three sheets of the 3 mm thick extrusion molded articles.

EXAMPLES 48 TO 51

Components were compounded according to each compounding formulation described in the following table and mixed using a tumbler mixer. Metal salt (B) was used after it was previously dissolved in plasticizer (F).

Melt kneading was conducted, using a twin-screw extruder having a screw diameter of 20 mm, of which screws rotates in the opposite directions, as a melt kneader, and setting the cylinder temperature to 100 to 170° C. The resin melted was extruded in a strand form, cooled by water cooling, and then fed to a pelletizer to prepare pellets. Using the resulting pellets, injection molding processing and extrusion molding processing were conducted, and various evaluations were carried out. Results are shown in the following table.

COMPARATIVE EXAMPLES 18 TO 21

Components were compounded according to each compounding formulation described in the following table, pellets were prepared in the same manner as with Example 48, and the evaluation of antistatic properties was carried out. However, the antistatic effect was not obtained. Results are shown in the following table.

TABLE 15

| Example | 48 | 49 | 50 | 51 |
|---|---|---|---|---|
| Compounding Ratio (parts) | | | | |
| (E-1) | 100 | 100 | 100 | 100 |
| Component (F); (Q-2) | 28 | 42 | 26 | 23 |
| (C-1) | 0 | 0 | 2 | 5 |
| Component (B); (B-2) | 0 | 0 | 0 | 2 |
| (B-1) | 2 | 3 | 2 | 0 |
| Results of Evaluation (Injection Molded Article) | | | | |
| Surface Resistivity ($\Omega$/sq.) | | | | |
| Before moisture conditioning | $1 \times 10^{10}$ | $5 \times 10^9$ | $1 \times 10^{10}$ | $6 \times 10^{10}$ |
| After 24 hrs | $3 \times 10^9$ | $8 \times 10^8$ | $2 \times 10^9$ | $9 \times 10^9$ |
| Volume Resistivity ($\Omega \cdot$ m) | | | | |
| Before moisture conditioning | $6 \times 10^9$ | $1 \times 10^9$ | $5 \times 10^9$ | $9 \times 10^9$ |
| After 24 hrs | $9 \times 10^8$ | $5 \times 10^8$ | $8 \times 10^8$ | $2 \times 10^9$ |
| Transparency | Transparent | Transparent | Transparent | Transparent |

TABLE 16

| Comparative Example | 18 | 19 | 20 | 21 |
|---|---|---|---|---|
| Compounding Ratio (parts) | | | | |
| (E-1) | 100 | 100 | 100 | 100 |
| Component (F); (Q-2) | 0 | 5 | 0 | 30 |
| (C-1) | 0 | 0 | 5 | 0 |
| Component (B); (B-2) | 0 | 0 | 2 | 0 |
| (B-1) | 2 | 2 | 0 | 0 |
| Results of Evaluation (Injection Molded Article) | | | | |
| Surface Resistivity ($\Omega$/sq.) | | | | |
| Before moisture conditioning | $1 \times 10^{12}$ or more | $1 \times 10^{12}$ or more | $1 \times 10^{12}$ or more | $1 \times 10^{12}$ or more |
| After 24 hrs | $1 \times 10^{12}$ or more | $1 \times 10^{12}$ or more | $1 \times 10^{12}$ or more | $1 \times 10^{12}$ or more |
| Volume Resistivity ($\Omega \cdot$ cm) | | | | |
| Before moisture conditioning | $1 \times 10^{12}$ or more | $1 \times 10^{12}$ or more | $1 \times 10^{12}$ or more | $1 \times 10^{12}$ or more |
| After 24 hrs | $1 \times 10^{12}$ or more | $1 \times 10^{12}$ or more | $1 \times 10^{12}$ or more | $1 \times 10^{12}$ or more |
| Transparency | Transparent | Transparent | Transparent | Transparent |

As for the evaluation of the antistatic properties, all the injection molded plates of Examples 48 to 51 of the present invention had a surface resistivity of $1 \times 10^{11}$ $\Omega$/sq. or less and a volume resistivity of $1 \times 10^{10}$ $\Omega \cdot$cm or less, and they were samples having the antistatic effect and excellent in transparency.

On the other hand, in Comparative Examples 18 to 21, the surface resistivity amounted to $1 \times 10^{12}$ $\Omega$/sq. or more, and the volume resistivity amounted to $1 \times 10^{12}$ $\Omega \cdot$cm or more. Thus, no antistatic effect was obtained at all.

Fourth Composition

Various types of components used in examples and comparative examples were as follows:

Method for Preparing Samples

LACTY 9020 (MFR: 11 g/l10 min, 190° C., at a load of 2,160 g) (E-2) and LACTY 9400 MFR: 5 g/l10 min, 190° C., at a load of 2,160 g) (E-1) both manufactured by SHIMADZU CORPORATION was used as polylactic acid-based resin.

As polyester resin (G), there were used polybutylene succinate adipate, BIONOLLE #3020 (Tg: −45° C., MFR: 20 g/10 min, 190° C., at a load of 2,160 g) (G-1) manufactured by SHOWA HIGHPOLYMER CO., LTD., and polycaprolactone, CELGREEN PH7 (Tg: −60° C., MFR: 4 g/10 min, 190° C., at a load of 2,160 g) (G-2) manufactured by DAICEL CHEMICAL INDUSTRIES, LTD.

As metal salt (B), there were used $Li.ClO_4$ (B-2), $Li.CF_3SO_3$ (B-4) and $Li.N(CF_3SO_2)_2$ (B-1).

As component (C), the following were used:

(C-2): Triethylene glycol diacetyl $CH_3COO(CH_2CH_2O)_2COCH_3$; and (C-1): Dibutoxyethoxyethyl adipate (Sankonol 0862, manufactured by Sanko Chemical Industry CO., Ltd.)

Further, as mixtures of component (B) and component (C), the following were used:

[(B-2)+(C-1)] (18): Sankonol 0862-18 (trade name) manufactured by Sanko Chemical Industry CO., Ltd. ($Li.CiO_4$/Sankonol 0862=18/82);

[(B-1)+(C-1)] (20): Sankonol 0862-20R (trade name) manufactured by Sanko Chemical Industry CO., Ltd. ($Li.N(CF_3SO_2)_2$/Sankonol 0862=20/80); and

[(B-1)+(C-1)] (50): Sankonol 0862-50R (trade name) manufactured by Sanko Chemical Industry CO., Ltd. ($Li.N(CF_3SO_2)_2$/Sankonol 0862=50/50)

Besides, triacetin (C-3) and monoacetyl glyceride (C-4) were used as metal salt-soluble liquids, and aluminum lake (S-1) (blue No. 2 of a food dye) was used as a coloring agent Methods for Preparing Formed Articles (Test Pieces)

<Injection Molding Processing>

Injection molding was conducted using an injection molding machine of a mold clamping pressure of 80 tons/cm², at a set cylinder temperature of 140 to 190° C. at a set mold temperature of 30° C.

<Extrusion Molding Processing>

Extrusion molding was conducted using a 20 mm single-screw extruder at a set cylinder temperature of 140 to 190° C., and using a tape-shaped die at a screw rotation speed of 10 to 30 rpm.

<Sheet Forming Processing>

Sheet forming was conducted using a 40 mm single-screw extruder at a set cylinder temperature of 150 to 210° C. to obtain a 50 μm thick transparent sheet.

Methods for Evaluating Physical Properties

The physical properties were measured in accordance with the ASTM Standards. The molded test piece was controlled at 25° C. at 50% RH for 24 hours, and measurements were made in accordance with the following standards.

For the bending test, measurements were made according to ASTM D792 using a ¼ in. test piece.

The evaluation of the antistatic properties was conducted in the same manner as described above. However, as test pieces, there were used a 6×6×0.3-cm injection molded plate, a 0.3 mm thick extrusion molded article and a 50 μm thick sheet. Immediately after molding, they were allowed to stand in a desiccator maintained at an environmental temperature of 25° C.±2° C. and a relative humidity of 20% or less for 24 hours, and then the surface resistivity and the volume resistivity were measured (before moisture conditioning). Then, similar measurements were made for the samples allowed to stand at an environmental temperature of 25° C.±2° C. and a relative humidity of 50% RH for 24 hours (after 24 hours) and the samples allowed to stand at an environmental temperature of 40° C.±2° C. and a relative humidity of 90% RH for 7 days (after 7 days) (after moisture conditioning).

Evaluation of Transparency

The transparency was evaluated using a 3 mm thick extrusion molded article. Evaluation criteria are as follows:

Transparent: When a story of a newspaper placed under ten sheets of the 3 mm thick extrusion molded articles was clearly read;

Translucent: When a story of a newspaper placed under four sheets of the 3 mm thick extrusion molded articles was clearly read;

Opaque: When it was difficult to read a story of a newspaper placed under four sheets of the 3 mm thick extrusion molded articles.

EXAMPLES 52 TO 63

Components and a coloring agent were compounded according to each compounding formulation described in the following tables and mixed using a tumbler mixer.

Melt kneading was conducted, using a twin-screw extruder having a screw diameter of 20 mm, of which screws rotates in the opposite directions, as a melt kneader, and setting the cylinder temperature to 140 to 190° C. The resin melted was extruded in a strand form, cooled by water cooling, and then fed to a pelletizer to prepare pellets. Using the resulting pellets, injection molding processing and extrusion molding processing (screw rotation speed: 30 rpm) were conducted, and various evaluations were carried out. Results are shown in the following tables.

EXAMPLES 64 TO 66

Components were compounded according to each compounding formulation described in the following table and mixed using a tumbler mixer. Metal salt (B) was used after it was previously dissolved in triethylene glycol diacetyl (C-2), triacetin (C-3) or monoacetyl glyceride (C-4), which is a liquid.

Pellets were prepared in the same manner as with Example 52, and various evaluations were carried out. Results are shown in the following table.

EXAMPLES 67 TO 69

Components were compounded according to each compounding formulation described in the following tables and mixed using a tumbler mixer.

Melt kneading was conducted, using a twin-screw extruder having a screw diameter of 20 mm, of which screws rotates in the opposite directions, as a melt kneader, and setting the cylinder temperature to 80 to 150° C. The resin melted was extruded in a strand form, cooled by water cooling, and then fed to a pelletizer to prepare pellets. Using the resulting pellets as a master batch, 33 parts of the pellets were mixed with 70 parts of LACTY 9020 (E-2). Then, injection molding processing and extrusion molding processing were conducted, and various evaluations were carried out. Results are shown in the following tables.

EXAMPLE 70

Components were compounded according to a compounding formulation described in the following table and mixed using a tumbler mixer.

Using this mixture, injection molding processing and extrusion molding processing (screw rotation speed: 10 rpm) were conducted, and various evaluations were carried out. Results are shown in the following table.

EXAMPLE 71

Components were compounded according to a compounding formulation described in the following table and mixed using a tumbler mixer.

Melt kneading was conducted, using a twin-screw extruder having a screw diameter of 20 mm, of which screws rotates in the opposite directions, as a melt kneader, and setting the cylinder temperature to 140 to 190° C. The resin melted was extruded in a strand form, cooled by water cooling, and then fed to a pelletizer to prepare pellets. Using the resulting pellets, sheet forming was conducted.

As a result, a 50 μm thick transparent sheet was obtained. Results are shown in the following table.

COMPARATIVE EXAMPLES 22 TO 24

Components were compounded according to each compounding formulation described in the following table, pellets were prepared in the same manner as with Example 52, and the antistatic properties were evaluated. However, the antistatic effect was not obtained. Results are shown in the following table.

TABLE 17

| Example | 52 | 53 | 54 | 55 |
|---|---|---|---|---|
| Component (E); (E-2) | 90 | 90 | 80 | 80 |
| (E-1) | 0 | 0 | 0 | 0 |
| Component (G); (C-1) | 10 | 10 | 20 | 20 |
| (G-2) | 0 | 0 | 0 | 0 |
| (B-2) + (C-1) (18) | 1 | 0 | 2 | 0 |
| (B-1) + (C-1) (20) | 0 | 0 | 0 | 2 |
| (B-1) + (C-1) (50) | 0 | 1 | 0 | 0 |
| (B-4) | 0 | 0 | 0 | 0 |
| (B-1) | 0 | 0 | 0 | 0 |
| (C-2) | 0 | 0 | 0 | 0 |
| (C-3) | 0 | 0 | 0 | 0 |
| (C-4) | 0 | 0 | 0 | 0 |
| Component (S); (S-1) | 0 | 0 | 0.1 | 0 |
| Results of Evaluation | | | | |
| Elastic Modulus in Bending | 3,600 | 3,600 | 3,400 | 3,400 |
| Injection Molded Article | | | | |
| Surface Resistivity (Ω/sq.) | | | | |
| Before moisture conditioning | $6.00 \times 10^{11}$ | $7.00 \times 10^{10}$ | $8.00 \times 10^{10}$ | $2.00 \times 10^{10}$ |
| After 24 hrs | $6.00 \times 10^{11}$ | $6.00 \times 10^{10}$ | $7.00 \times 10^{10}$ | $9.00 \times 10^{9}$ |
| After 7 days | $5.00 \times 10^{11}$ | $4.00 \times 10^{10}$ | $7.00 \times 10^{10}$ | $9.00 \times 10^{9}$ |
| Volume Resistivity (Ω · cm) | | | | |
| Before moisture conditioning | $6.00 \times 10^{11}$ | $6.00 \times 10^{10}$ | $8.00 \times 10^{10}$ | $1.00 \times 10^{10}$ |
| After 24 hrs | $6.00 \times 10^{11}$ | $6.00 \times 10^{10}$ | $8.00 \times 10^{10}$ | $9.00 \times 10^{9}$ |
| After 7 days | $5.00 \times 10^{11}$ | $5.00 \times 10^{10}$ | $8.00 \times 10^{10}$ | $8.00 \times 10^{9}$ |
| Extrusion Molded Article | | | | |
| (0.3 mm thick) | | | | |
| Surface Resistivity (Ω/sq.) | | | | |
| Before moisture conditioning | $6.00 \times 10^{11}$ | $6.00 \times 10^{10}$ | $2.00 \times 10^{11}$ | $3.00 \times 10^{10}$ |
| After 24 hrs | $6.00 \times 10^{11}$ | $6.00 \times 10^{10}$ | $2.00 \times 10^{11}$ | $1.00 \times 10^{10}$ |
| After 7 days | $6.00 \times 10^{11}$ | $4.00 \times 10^{10}$ | $2.00 \times 10^{11}$ | $1.00 \times 10^{10}$ |
| Bleeding-out | Nil | Nil | Nil | Nil |
| Transparency | Transparent | Translucent | Blue transparent | Translucent |

| Example | 56 | 57 | 58 | 59 |
|---|---|---|---|---|
| Component (E); (E-2) | 80 | 80 | 70 | 70 |
| (E-1) | 0 | 0 | 0 | 0 |
| Component (G); (C-1) | 20 | 20 | 30 | 30 |
| (G-2) | 0 | 0 | 0 | 0 |
| (B-2) + (C-1) (18) | 0 | 0 | 3 | 5 |
| (B-1) + (C-1) (20) | 0 | 0 | 0 | 0 |
| (B-1) + (C-1) (50) | 0.8 | 2 | 0 | 0 |
| (B-4) | 0 | 0 | 0 | 0 |
| (B-1) | 0 | 0 | 0 | 0 |
| (C-2) | 0 | 0 | 0 | 0 |
| (C-3) | 0 | 0 | 0 | 0 |
| (C-4) | 0 | 0 | 0 | 0 |
| Component (S); (S-1) | 0 | 0 | 0 | 0 |

TABLE 17-continued

| Results of Evaluation | | | | |
|---|---|---|---|---|
| Elastic Modulus in Bending | 3,500 | 3,400 | 3,100 | 2,900 |
| Injection Molded Article | | | | |
| Surface Resistivity (Ω/sq.) | | | | |
| Before moisture conditioning | $4.00 \times 10^{10}$ | $9.00 \times 10^9$ | $9.00 \times 10^9$ | $1.00 \times 10^9$ |
| After 24 hrs | $3.00 \times 10^{10}$ | $8.00 \times 10^9$ | $9.00 \times 10^9$ | $1.00 \times 10^9$ |
| After 7 days | $2.00 \times 10^{10}$ | $8.00 \times 10^9$ | $9.00 \times 10^9$ | $9.00 \times 10^8$ |
| Volume Resistivity (Ω · cm) | | | | |
| Before moisture conditioning | $2.00 \times 10^{10}$ | $9.00 \times 10^9$ | $9.00 \times 10^9$ | $9.00 \times 10^8$ |
| After 24 hrs | $2.00 \times 10^{10}$ | $8.00 \times 10^9$ | $1.00 \times 10^{10}$ | $9.00 \times 10^8$ |
| After 7 days | $1.00 \times 10^{10}$ | $7.00 \times 10^9$ | $9.00 \times 10^9$ | $8.00 \times 10^8$ |
| Extrusion Molded Article | | | | |
| (0.3 mm thick) | | | | |
| Surface Resistivity (Ω/sq.) | | | | |
| Before moisture conditioning | $4.00 \times 10^{10}$ | $9.00 \times 10^9$ | $9.00 \times 10^9$ | $2.00 \times 10^9$ |
| After 24 hrs | $4.00 \times 10^{10}$ | $9.00 \times 10^9$ | $9.00 \times 10^9$ | $2.00 \times 10^9$ |
| After 7 days | $3.00 \times 10^{10}$ | $8.00 \times 10^9$ | $7.00 \times 10^9$ | $9.00 \times 10^8$ |
| Bleeding-out | Nil | Nil | Nil | Nil |
| Transparency | Translucent | Translucent | Translucent | Translucent |

TABLE 18

| Example | 60 | 61 | 62 | 63 |
|---|---|---|---|---|
| Component (E); (E-2) | 70 | 70 | 70 | 60 |
| (E-1) | 0 | 0 | 0 | 0 |
| Component (G); (C-1) | 30 | 30 | 0 | 40 |
| (G-2) | 0 | 0 | 30 | 0 |
| (B-2) + (C-1) (18) | 0 | 0 | 3 | 7 |
| (B-1) + (C-1) (20) | 0 | 0 | 0 | 0 |
| (B-1) + (C-1) (50) | 3 | 0 | 0 | 0 |
| (B-4) | 0 | 1 | 0 | 0 |
| (B-1) | 0 | 0 | 0 | 0 |
| (C-2) | 0 | 0 | 0 | 0 |
| (C-3) | 0 | 0 | 0 | 0 |
| (C-4) | 0 | 0 | 0 | 0 |
| Component (S); (S-1) | 0 | 0 | 0 | 0 |
| Results of Evaluation | | | | |
| Elastic Modulus in Bending | 3,100 | 3,200 | 2,800 | 2,400 |
| Injection Molded Article | | | | |
| Surface Resistivity (Ω/sq.) | | | | |
| Before moisture conditioning | $4.00 \times 10^8$ | $7.00 \times 10^9$ | $3.00 \times 10^{10}$ | $6.00 \times 10^8$ |
| After 24 hrs | $4.00 \times 10^8$ | $5.00 \times 10^9$ | $2.00 \times 10^9$ | $6.00 \times 10^8$ |
| After 7 days | $4.00 \times 10^8$ | $3.00 \times 10^9$ | $2.00 \times 10^9$ | $6.00 \times 10^8$ |
| Volume Resistivity (Ω · cm) | | | | |
| Before moisture conditioning | $1.00 \times 10^8$ | $1.00 \times 10^9$ | $2.00 \times 10^{10}$ | $4.00 \times 10^8$ |
| After 24 hrs | $9.00 \times 10^7$ | $9.00 \times 10^8$ | $1.00 \times 10^{10}$ | $3.00 \times 10^8$ |
| After 7 days | $9.00 \times 10^7$ | $9.00 \times 10^8$ | $9.00 \times 10^9$ | $3.00 \times 10^8$ |
| Extrusion Molded Article | | | | |
| (0.3 mm thick) | | | | |
| Surface Resistivity (Ω/sq.) | | | | |
| Before moisture conditioning | $5.00 \times 10^9$ | $6.00 \times 10^9$ | $6.00 \times 10^9$ | $5.00 \times 10^8$ |
| After 24 hrs | $5.00 \times 10^9$ | $5.00 \times 10^9$ | $6.00 \times 10^9$ | $5.00 \times 10^8$ |
| After 7 days | $9.00 \times 10^8$ | $5.00 \times 10^9$ | $6.00 \times 10^9$ | $2.00 \times 10^8$ |
| Bleeding-out | Nil | Nil | Nil | Nil |
| Transparency | Transparent | Translucent | Opaque | Opaque |
| Example | 64 | 65 | 66 | 67 |
| Component (E); (E-2) | 70 | 70 | 70 | 70 |
| (E-1) | 0 | 0 | 0 | 0 |
| Component (G); (C-1) | 30 | 30 | 30 | 30 |
| (G-2) | 0 | 0 | 0 | 0 |
| (B-2) + (C-1) (18) | 0 | 0 | 0 | 3 |
| (B-1) + (C-1) (20) | 0 | 0 | 0 | 0 |
| (B-1) + (C-1) (50) | 0 | 0 | 0 | 0 |
| (B-4) | 1 | 0 | 0 | 0 |
| (B-1) | 0 | 1 | 1 | 0 |

TABLE 18-continued

| | | | | |
|---|---|---|---|---|
| (C-2) | 4 | 0 | 0 | 0 |
| (C-3) | 0 | 4 | 0 | 0 |
| (C-4) | 0 | 0 | 4 | 0 |
| Component (S); (S-1) | 0 | 0 | 0 | 0 |
| Results of Evaluation | | | | |
| Elastic Modulus in Bending Injection Molded Article Surface Resistivity (Ω/sq.) | 2,900 | 2,800 | 2,800 | 3,000 |
| Before moisture conditioning | $4.00 \times 10^9$ | $2.00 \times 10^9$ | $1.00 \times 10^9$ | $1.00 \times 10^{10}$ |
| After 24 hrs | $4.00 \times 10^9$ | $2.00 \times 10^9$ | $1.00 \times 10^9$ | $9.00 \times 10^9$ |
| After 7 days | $2.00 \times 10^9$ | $1.00 \times 10^9$ | $9.00 \times 10^8$ | $9.00 \times 10^9$ |
| Volume Resistivity (Ω · cm) | | | | |
| Before moisture conditioning | $9.00 \times 10^8$ | $8.00 \times 10^8$ | $8.00 \times 10^8$ | $1.00 \times 10^{10}$ |
| After 24 hrs | $8.00 \times 10^8$ | $8.00 \times 10^8$ | $8.00 \times 10^8$ | $9.00 \times 10^9$ |
| After 7 days | $8.00 \times 10^8$ | $7.00 \times 10^8$ | $7.00 \times 10^8$ | $9.00 \times 10^9$ |
| Extrusion Molded Article (0.3 mm thick) Surface Resistivity (Ω/sq.) | | | | |
| Before moisture conditioning | $4.00 \times 10^9$ | $2.00 \times 10^9$ | $2.00 \times 10^9$ | $9.00 \times 10^9$ |
| After 24 hrs | $3.00 \times 10^9$ | $1.00 \times 10^9$ | $2.00 \times 10^9$ | $9.00 \times 10^9$ |
| After 7 days | $3.00 \times 10^9$ | $9.00 \times 10^8$ | $8.00 \times 10^8$ | $1.00 \times 10^9$ |
| Bleeding-out | Nil | Nil | Nil | Nil |
| Transparency | Transparent | Translucent | Blue transparent | Translucent |

TABLE 19

| Example | 68 | 69 | 70 | 71 |
|---|---|---|---|---|
| Component (E); (E-2) | 70 | 70 | 70 | 0 |
| (E-1) | 0 | 0 | 0 | 70 |
| Component (G); (C-1) | 0 | 30 | 30 | 30 |
| (G-2) | 30 | 0 | 0 | 0 |
| (B-2) + (C-1) (18) | 3 | 0 | 3 | 3 |
| (B-1) + (C-1) (20) | 0 | 0 | 0 | 0 |
| (B-1) + (C-1) (50) | 0 | 0 | 0 | 0 |
| (B-4) | 0 | 3 | 0 | 0 |
| (B-1) | 0 | 0 | 0 | 0 |
| (C-2) | 0 | 0 | 0 | 0 |
| (C-3) | 0 | 0 | 0 | 0 |
| (C-4) | 0 | 0 | 0 | 0 |
| Component (S); (S-1) | 0 | 0 | 0 | 0 |
| Results of Evaluation | | | | |
| Elastic Modulus in Bending Injection Molded Article Surface Resistivity (Ω/sq.) | 2,800 | 3,200 | 3,000 | — |
| Before moisture conditioning | $4.00 \times 10^{10}$ | $9.00 \times 10^8$ | $1.00 \times 10^{10}$ | — |
| After 24 hrs | $4.00 \times 10^{10}$ | $7.00 \times 10^8$ | $1.00 \times 10^{10}$ | — |
| After 7 days | $4.00 \times 10^{10}$ | $6.00 \times 10^8$ | $1.00 \times 10^{10}$ | — |
| Volume Resistivity (Ω · cm) | | | | |
| Before moisture conditioning | $1.00 \times 10^{10}$ | $4.00 \times 10^8$ | $9.00 \times 10^9$ | — |
| After 24 hrs | $1.00 \times 10^{10}$ | $4.00 \times 10^8$ | $9.00 \times 10^9$ | — |
| After 7 days | $1.00 \times 10^{10}$ | $3.00 \times 10^8$ | $9.00 \times 10^9$ | — |
| Extrusion Molded Article (0.3 mm thick) *3 Surface Resistivity (Ω/sq.) | | | | |
| Before moisture conditioning | $7.00 \times 10^9$ | $5.00 \times 10^8$ | $9.00 \times 10^9$ | $9.00 \times 10^9$ |
| After 24 hrs | $7.00 \times 10^9$ | $5.00 \times 10^8$ | $9.00 \times 10^9$ | $9.00 \times 10^9$ |
| After 7 days | $6.00 \times 10^9$ | $2.00 \times 10^8$ | $9.00 \times 10^9$ | $8.00 \times 10^9$ |
| Bleeding-out | Nil | Nil | Nil | Nil |
| Transparency | Transparent | Translucent | Translucent | Translucent |
| Comparative Example | 22 | 23 | 24 | |
| Component (E); (E-2) | 70 | 100 | 99 | |
| (E-1) | 0 | 0 | 0 | |
| Component (G); (C-1) | 30 | 0 | 1 | |
| (G-2) | 0 | 0 | 0 | |

TABLE 19-continued

| | | | |
|---|---|---|---|
| (B-2) + (C-1) (18) | 0 | 1 | 3 |
| (B-1) + (C-1) (20) | 0 | 0 | 0 |
| (B-1) + (C-1) (50) | 0 | 0 | 0 |
| (B-4) | 0 | 0 | 0 |
| (B-1) | 0 | 0 | 0 |
| (C-2) | 0 | 0 | 0 |
| (C-3) | 0 | 0 | 0 |
| (C-4) | 0 | 0 | 0 |
| Component (S); (S-1) | 0 | 0 | 0 |
| Results of Evaluation | | | |
| Elastic Modulus in Bending Injection Molded Article | — | — | — |
| Surface Resistivity (Ω/sq.) | | | |
| Before moisture conditioning | $1.00 \times 10^{12} \leq$ | $1.00 \times 10^{12} \leq$ | $1.00 \times 10^{12} \leq$ |
| After 24 hrs | $1.00 \times 10^{12} \leq$ | $1.00 \times 10^{12} \leq$ | $1.00 \times 10^{12} \leq$ |
| After 7 days | $1.00 \times 10^{12} \leq$ | $1.00 \times 10^{12} \leq$ | $1.00 \times 10^{12} \leq$ |
| Volume Resistivity (Ω · cm) | | | |
| Before moisture conditioning | $1.00 \times 10^{12} \leq$ | $1.00 \times 10^{12} \leq$ | $1.00 \times 10^{12} \leq$ |
| After 24 hrs | $1.00 \times 10^{12} \leq$ | $1.00 \times 10^{12} \leq$ | $1.00 \times 10^{12} \leq$ |
| After 7 days | $1.00 \times 10^{12} \leq$ | $1.00 \times 10^{12} \leq$ | $1.00 \times 10^{12} \leq$ |

*3) Only in Example 71, measurements were made using a 50 μm thick extrusion molded sheet.

The surface resistivity and volume resistivity of the injection molded plates of Examples 52 to 70 of the present invention and the surface resistivity of the extrusion molded articles of Examples 52 to 71 were all $6 \times 10^{11}$ Ω/sq. or less, and they were samples having the antistatic effect, having no bleeding-out and excellent in transparency.

On the other hand, in Comparative Examples 22 to 24, the resistivity amounted to $1 \times 10^{12}$ Ω·cm or more. Thus, no antistatic effect was obtained at all.

Fifth Composition

Various types of components used in examples and comparative examples were as follows:

Thermoplastic polyurethane elastomer (H-1);

PANDEX T-1190 manufactured by DAINIPPON INK & CHEMICALS INC., an adipate-based polyurethane, was used.

[(B-2)+(C-1)] (20);

"Sankonol 0862-20" (trade name) manufactured by Sanko Chemical Industry CO., Ltd. was used in which lithium perchlorate was dissolved as a metal salt in dibutoxyethoxyethyl adipate in an amount of 20%.

MP100 [(B-3)+(P)] manufactured by Akishima Chemical Industries CO., Ltd. was used as a comparative example.

Preparation of Test Pieces

Sample pellets were molded into each test piece with an injection molding machine of a mold clamping pressure of 80 tons/cm². The molding conditions were as follows. Cylinder temperature: 200° C. Mold temperature: 40° C.

As for measurements of physical properties, measurements of the following physical properties were made, after the test piece was controlled at room temperature (23±2° C.) and a relative humidity of 50% for 24 hours.

The tensile strength and elongation was measured in accordance with JIS K7311.

Volume Resistivity (Conductivity)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity between both the electrodes was determined. The unit in the following tables is Ω·cm.

EXAMPLES 72 TO 79

Antistatic polyurethane elastomers were prepared based on compounding formulations described in the following tables, and evaluated.

As for the dry-blended directly formable compositions, the thermoplastic polyurethane elastomer, dibutoxyethoxyethyl adipate and further "Sankonol 0862-20" (trade name) manufactured by Sanko Chemical Industry CO., Ltd. in which lithium perchlorate was dissolved as a metal salt in an amount of 20% were compounded, mixed and preliminarily dry blended in a tumbler mixer to prepare the directly formable antistatic polyurethane elastomer compositions.

Further, as for a method for preparing kneaded pelletized compositions, the antistatic polyurethane elastomer compositions were each melt mixed by use of a 47 mm twin-screw extruder of which screws rotates in the same direction at 190° C., and a strand-like melt resin mixture extruded from a die was cooled in a water bath and passed through a cutter to prepare pellets of the antistatic polyurethane elastomer composition.

Results are shown in the following tables.

TABLE 20

Composition Obtained by Pelletizing Compound Compounded in Preliminary Mixer

|  | Example 72 | Example 73 | Example 74 | Comparative Example 75 |
|---|---|---|---|---|
| I. Compounding Formulation (parts) | | | | |
| T-1190 (H-1) | 100 | 100 | 100 | 100 |
| [(B-2) + (C-1)] (20) | 1 | 3 | 5 | 0 |
| [(B-3) + (P)] (MP100) | 0 | 0 | 0 | 1 |
| II. Results of Evaluation | | | | |
| Tensile Strength (MPa) | 31 | 28 | 24 | 26 |
| Elongation (%) | 350 | 380 | 400 | 370 |
| Volume Resistivity ($\Omega \cdot cm$) | $2 \times 10^8 \sim 3 \times 10^8$ | $3 \times 10^7 \sim 5 \times 10^7$ | $1 \times 10^7 \sim 2 \times 10^7$ | $2 \times 10^8 \sim 3 \times 10^8$ |
| Bleeding-out (after) | | | | |
| 24 hrs | ⊚ | ⊚ | ⊚ | ○ |
| 48 hrs | ⊚ | ⊚ | ⊚ | ○ |
| 120 hrs | ⊚ | ⊚ | ○ | Δ |
| 168 hrs | ⊚ | ⊚ | ○ | Δ |

TABLE 21

Directly Formable Composition Obtained by Dry Blending

|  | Example 76 | Example 77 | Example 78 | Comparative Example 79 |
|---|---|---|---|---|
| Compounding Formulation (parts) | | | | |
| T-1190 (H-1) | 100 | 100 | 100 | 100 |
| [(B-2) + (C-1)] (20) | 1 | 3 | 5 | 0 |
| [(B-3) + (P)] (MP100) | 0 | 0 | 0 | 1 |
| Results of Evaluation | | | | |
| Tensile Strength (MPa) | 38 | 35 | 30 | 34 |
| Elongation (%) | 400 | 410 | 430 | 400 |
| Volume Resistivity ($\Omega \cdot cm$) | $1 \times 10^8 \sim 3 \times 10^8$ | $2 \times 10^7 \sim 3 \times 10^7$ | $1 \times 10^7 \sim 2 \times 10^7$ | $2 \times 10^8 \sim 3 \times 10^8$ |
| Bleeding-out (after) | | | | |
| 24 hrs | ⊚ | ⊚ | ⊚ | ○ |
| 48 hrs | ⊚ | ⊚ | ⊚ | ○ |
| 120 hrs | ⊚ | ⊚ | ○ | Δ |
| 168 hrs | ○ | ○ | ○ | Δ |

Sixth Composition

Various types of components used in examples and comparative examples were as follows:

Thermoplastic resin (I-1);

TOYOLAC 600 (trade name) (Tg: 80~90° C.) manufactured by Toray Industries, Inc., an ABS resin (elastic modulus in bending: 2,500 MPa), was used.

Component (J);

PANDEX T-1190 (Tg: −40 to −45° C.) manufactured by DAINIPPON INK & CHEMICALS INC., an adipate-based polyurethane, was used as polyurethane-based elastomer (J-1).

A polyether/polyester-based thermoplastic polyester elastomer (trade name: PELPRENE P-40B, hardness D=31, Tg: −60 to −70° C.) manufactured by TOYOBO CO., LTD. was used as polyether polyester-based elastomer (J-2).

BIONOLLE 3001 (Tg: −45° C.) manufactured by SHOWA HIGHPOLYMER CO., LTD. was used as aliphatic polyester-based resin (J-3). The above-mentioned hardness D was measured in accordance with ASTM D2240, and the unit is dimensionless.

PEBAX 2533 (Tg: −60 to −70° C.) manufactured by Elf Atochem was used as polyamide-based elastomer (J-4).

Pelestat 6321 (Tg: −45 to −55° C.) manufactured by Sanyo Chemical industries, Ltd. was used as polyetheresteramide (hereinafter also referred to as "PEEA" in the following tables) (J-5).

(C-1); Bis[2-(2-butoxyethoxy)ethyl]adipate

Component (B-2); Lithium perchlorate

Component (K);

Calcium silicate fiber (K-1) (average fiber diameter=1 to 10 μm, average fiber length=20 to 40 μm, trade name: "KEMOLIT S-3", manufactured by Tsuchiya Kaolin Industries, Ltd.)

Talc (K-2) (average particle size=7 μm, trade name: "Talc TT", manufactured by TAKEHARA CHEMICAL INDUSTRIAL CO., LTD.)

Mica (K-3) (average particle size=90 μm, trade name: "Suzorite Mica 200KI", manufactured by Kuraray Co., Ltd.)

Fillers used in comparative examples;

Glass fiber (T-1) (average fiber diameter=13 μm, average fiber length=3 mm, trade name: "Glass Fiber CS-3PE-291S", manufactured by Nitto Boseki Co., Ltd.)

Carbon fiber (T-2) [pitch-type carbon fiber (average fiber diameter=12 μm, average fiber length=3 mm), trade name: "Xylus GC-03J-415", manufactured by Osaka Gas Co., Ltd.]

EXAMPLES 80 TO 124 AND COMPARATIVE EXAMPLES 25 TO 68

Preparation of Compositions

According to each compounding formulation in the following tables, (preliminary dry blending was conducted with a tumbler mixer, a 47 mm twin), while melt mixing thermoplastic resin (I), component (J) and components (B) and (C) by use of the extruder at 220° C., component (K) or another inorganic filler was cut out and put in a mixture in a melt state from a center portion of a barrel of the extruder by use of a metering feeder. After the putting, each strand-like melt mixture extruded from a die was cooled in a water bath, and passed through a cutter to prepare pellets of each antistatic composition.

Preparation of Test Pieces

Each test piece was molded from sample pellets with an injection molding machine of a mold clamping pressure of 80 tons/cm$^2$. For the molding conditions, the cylinder temperature was 220° C. and the mold temperature was 60° C.

Measurements of Physical Properties

After the test piece was controlled at 23±2° C. and a relative humidity of 50% RH for 24 hours, measurements of the following physical properties were made.

(1) Bending Strength (Elastic Modulus in Bending)

It was measured in accordance with ASTM D760. The unit in the following tables is MPa.

In the present invention, an elastic modulus in bending of 1,600 MPa or more was intended.

(2) Izod Impact Strength

It was measured in accordance with ASTM D256 using a ¼-inch thick test sample with a notch. The unit in the following tables is J/m.

In the present invention, an Izod impact strength of 25 J/m or more was intended.

(3) Surface Resistivity

Measurements were made with HIRESTA manufactured by Mitsubishi Chemical Corporation in accordance with ASTM D257 using an injection molded test piece with 6 (width)×6 (length)×0.3 (thickness) (cm).

In the present invention, a surface resistivity of $10^{10}$ Ω/sq. or less was intended.

(4) Formability, Surface Smoothness and Dimensional Stability

Sample pellets were molded into a formed article with an injection molding machine of a mold clamping pressure of 220 tons/cm$^2$ at a cylinder temperature of 220° C. and a mold temperature of 60° C., using a mold having 11 gates with 13 (width)×32 (length)×0.5 (thickness) (cm). The state of the formed article was observed and evaluated as follows:

Formability

The formability (overall judgment of flowability, releasability, shortshot, breakage at a sprue end and the like) of the formed article was evaluated according the following criteria:

⊚: Very good.

○: Formable.

Δ: Formable, but unable to conduct a stable forming operation.

X: Impossible to form.

Appearance of Formed Article

The overall judgment of flashing, weld marks, flash marks, shagginess and the like was evaluated according to the following criteria by visually observing the formed article:

⊚: Very good.

○: Available.

Δ: Available for general-purpose parts, but unsuitable for precision parts.

X: Nonusable

Other defects are described together in the tables.

Dimensional Stability

As for the evaluation of dimensional stability, there were visually evaluated warping, sink marks, deformation and the like which become problems as the form of the formed article.

TABLE 22

| Example | 80 | 81 | 82 | 83 | 84 | 85 |
|---|---|---|---|---|---|---|
| Compounding Formulation (parts) | | | | | | |
| ABS Resin (I-1) | 90 | 90 | 90 | 85 | 80 | 75 |
| Polyurethane-Based (J-1) | 10 | 10 | 10 | 15 | 20 | 25 |
| Polyetherester-Based (J-2) | 0 | 0 | 0 | 0 | 0 | 0 |
| (I) + (J) | 100 | 100 | 100 | 100 | 100 | 100 |
| (C-1) | 1.0 | 1.0 | 1.0 | 1.0 | 1.0 | 1.0 |
| LiClO$_4$ (B-2) | 0.2 | 0.2 | 0.2 | 0.2 | 0.2 | 0.2 |
| Calcium Silicate Fiber (K-1)*[4] | 5 | 10 | 20 | 10 | 10 | 10 |
| Talc (K-2)*[4] | 0 | 0 | 0 | 0 | 0 | 0 |
| Mica (K-3)*[4] | 0 | 0 | 0 | 0 | 0 | 0 |
| Results of Evaluation | | | | | | |
| Elastic Modulus in Bending (MPa) | 2,380 | 2,780 | 3,390 | 2,380 | 2,090 | 1,780 |
| Izod Impact Strength (J/m) | 50 | 40 | 35 | 32 | 32 | 42 |
| Surface Resistivity (Ω/sq.) | $10^9$ | $10^9$ | $10^9$ | $10^9$ | $10^8$ | $10^8$ |
| Formability | ⊚ | ⊚ | ○ | ⊚ | ⊚ | ⊚ |
| Surface Smoothness | ⊚ | ⊚ | ⊚ | ⊚ | ⊚ | ⊚ |

TABLE 22-continued

| | | | | | | |
|---|---|---|---|---|---|---|
| Dimensional Stability | ◎ | ◎ | ◎ | ◎ | ◎ | ◎ |
| Defects such as Warping, Sink Marks and Deformation | No defects | No defects | No defects | No defects | No defects | No defects |
| Example | 86 | 87 | 88 | 89 | 90 | 91 |
| Compounding Formulation (parts) | | | | | | |
| ABS Resin (I-1) | 90 | 90 | 90 | 90 | 90 | 90 |
| Polyurethane-Based (J-1) | 10 | 10 | 10 | 0 | 0 | 0 |
| Polyetherester-Based (J-2) | 0 | 0 | 0 | 10 | 10 | 10 |
| (I) + (J) | 100 | 100 | 100 | 100 | 100 | 100 |
| (C-1) | 1.0 | 1.0 | 1.0 | 1.0 | 1.0 | 1.0 |
| LiClO$_4$ (B-2) | 0.2 | 0.2 | 0.2 | 0.2 | 0.2 | 0.2 |
| Calcium Silicate Fiber (K-1)*[4] | 0 | 0 | 0 | 5 | 10 | 20 |
| Talc (K-2)*[4] | 10 | 0 | 20 | 0 | 0 | 0 |
| Mica (K-3)*[4] | 0 | 10 | 0 | 0 | 0 | 0 |
| Results of Evaluation | | | | | | |
| Elastic Modulus in Bending (MPa) | 2,180 | 2,180 | 2,480 | 2,480 | 2,810 | 3,420 |
| Izod Impact Strength (J/m) | 41 | 33 | 30 | 48 | 38 | 35 |
| Surface Resistivity (Ω/sq.) | $10^9$ | $10^9$ | $10^9$ | $10^9$ | $10^9$ | $10^9$ |
| Formability | ◎ | ○ | ○ | ◎ | ◎ | ○ |
| Surface Smoothness | ◎ | ◎ | ○ | ◎ | ◎ | ◎ |
| Dimensional Stability | ○ | ○ | ○ | ◎ | ◎ | ◎ |
| Defects such as Warping, Sink Marks and Deformation | Slight warping | Slight warping | Slight warping | No defects | No defects | No defects |

TABLE 23

| Example | 92 | 93 | 94 | 95 | 96 | 97 |
|---|---|---|---|---|---|---|
| Compounding Formulation (parts) | | | | | | |
| ABS Resin (I-1) | 85 | 80 | 75 | 90 | 90 | 90 |
| Polyurethane-Based (J-2) | 15 | 20 | 25 | 10 | 10 | 10 |
| Polyetherester-Based (J-4) | 0 | 0 | 0 | 0 | 0 | 0 |
| (I) + (J) | 100 | 100 | 100 | 100 | 100 | 100 |
| (C-1) | 1.0 | 1.0 | 1.0 | 1.0 | 1.0 | 1.0 |
| LiClO$_4$ (B-2) | 0.2 | 0.2 | 0.2 | 0.2 | 0.2 | 0.2 |
| Calcium Silicate Fiber (K-1)*[4] | 10 | 10 | 10 | 0 | 0 | 0 |
| Talc (K-2)*[4] | 0 | 0 | 0 | 10 | 0 | 20 |
| Mica (K-3)*[4] | 0 | 0 | 0 | 0 | 10 | 0 |
| Results of Evaluation | | | | | | |
| Elastic Modulus in Bending (MPa) | 2,420 | 2,120 | 1,830 | 2,220 | 2,230 | 2,530 |
| Izod Impact Strength (J/m) | 32 | 34 | 40 | 38 | 35 | 35 |
| Surface Resistivity (Ω/sq.) | $10^9$ | $10^8$ | $10^8$ | $10^9$ | $10^9$ | $10^9$ |
| Formability | ◎ | ◎ | ◎ | ◎ | ○ | ○ |
| Surface Smoothness | ◎ | ◎ | ◎ | ◎ | ○ | ◎ |
| Dimensional Stability | ◎ | ◎ | ◎ | ○ | ○ | ○ |
| Defects such as Warping, Sink Marks and Deformation | No defects | No defects | No defects | Slight warping | Slight warping | Slight warping |
| Example | 98 | 99 | 100 | 101 | 102 | 103 |
| Compounding Formulation (parts) | | | | | | |
| ABS Resin (I-1) | 90 | 90 | 90 | 85 | 80 | 75 |
| Polyurethane-Based (J-2) | 0 | 0 | 0 | 0 | 0 | 0 |
| Polyetherester-Based (J-4) | 10 | 10 | 10 | 15 | 20 | 25 |
| (I) + (J) | 100 | 100 | 100 | 100 | 100 | 100 |
| (C-1) | 1.0 | 1.0 | 1.0 | 1.0 | 1.0 | 1.0 |
| LiClO$_4$ (B-2) | 0.2 | 0.2 | 0.2 | 0.2 | 0.2 | 0.2 |
| Calcium Silicate Fiber (K-1)*[4] | 5 | 10 | 20 | 10 | 10 | 10 |
| Talc (K-2)*[4] | 0 | 0 | 0 | 0 | 0 | 0 |
| Mica (K-3)*[4] | 0 | 0 | 0 | 0 | 0 | 0 |
| Results of Evaluation | | | | | | |
| Elastic Modulus in Bending (MPa) | 2,400 | 2,800 | 3,400 | 2,390 | 2,100 | 1,800 |
| Izod Impact Strength (J/m) | 50 | 36 | 33 | 38 | 40 | 42 |
| Surface Resistivity (Ω/sq.) | $10^9$ | $10^9$ | $10^9$ | $10^9$ | $10^8$ | $10^8$ |
| Formability | ◎ | ◎ | ○ | ◎ | ◎ | ◎ |
| Surface Smoothness | ◎ | ◎ | ◎ | ◎ | ◎ | ◎ |

TABLE 23-continued

| | | | | | | |
|---|---|---|---|---|---|---|
| Dimensional Stability | ◉ | ◉ | ◉ | ◉ | ◉ | ◉ |
| Defects such as Warping, Sink Marks and Deformation | No defects | No defects | No defects | No defects | No defects | No defects |

TABLE 24

| Example | 104 | 105 | 106 | 107 | 108 | 109 |
|---|---|---|---|---|---|---|
| Compounding Formulation (parts) | | | | | | |
| ABS Resin (I-1) | 90 | 90 | 90 | 90 | 90 | 90 |
| Polyamide-Based (J-4) | 10 | 10 | 10 | 0 | 0 | 0 |
| Polyester-Based (J-3) | 0 | 0 | 0 | 10 | 10 | 10 |
| (I) + (J) | 100 | 100 | 100 | 100 | 100 | 100 |
| (C-1) | 1.0 | 1.0 | 1.0 | 1.0 | 1.0 | 1.0 |
| $LiClO_4$ (B-2) | 0.2 | 0.2 | 0.2 | 0.2 | 0.2 | 0.2 |
| Calcium Silicate Fiber (K-1)*[4] | 0 | 0 | 0 | 5 | 10 | 20 |
| Talc (K-2)*[4] | 10 | 0 | 20 | 0 | 0 | 0 |
| Mica (K-3)*[4] | 0 | 10 | 0 | 0 | 0 | 0 |
| Results of Evaluation | | | | | | |
| Elastic Modulus in Bending (MPa) | 2,200 | 2,190 | 2,490 | 2,500 | 2,830 | 3,450 |
| Izod Impact Strength (J/m) | 41 | 33 | 30 | 44 | 35 | 32 |
| Surface Resistivity (Ω/sq.) | $10^9$ | $10^9$ | $10^9$ | $10^9$ | $10^9$ | $10^9$ |
| Formability | ◉ | ◯ | ◯ | ◉ | ◉ | ◯ |
| Surface Smoothness | ◉ | ◉ | ◉ | ◉ | ◉ | ◉ |
| Dimensional Stability | ◯ | ◯ | ◯ | ◉ | ◉ | ◉ |
| Defects such as Warping, Sink Marks and Deformation | Slight warping | Slight warping | Slight warping | No defects | No defects | No defects |

| Example | 110 | 111 | 112 | 113 | 114 | 115 |
|---|---|---|---|---|---|---|
| Compounding Formulation (parts) | | | | | | |
| ABS Resin (I-1) | 85 | 80 | 75 | 90 | 90 | 90 |
| Polyamide-Based (J-4) | 0 | 0 | 0 | 0 | 0 | 0 |
| Polyester-Based (J-3) | 15 | 20 | 25 | 10 | 10 | 10 |
| (I) + (J) | 100 | 100 | 100 | 100 | 100 | 100 |
| (C-1) | 1.0 | 1.0 | 1.0 | 1.0 | 1.0 | 1.0 |
| $LiClO_4$ (B-2) | 0.2 | 0.2 | 0.2 | 0.2 | 0.2 | 0.2 |
| Calcium Silicate Fiber (K-1)*[4] | 10 | 10 | 10 | 0 | 0 | 0 |
| Talc (K-2)*[4] | 0 | 0 | 0 | 10 | 0 | 20 |
| Mica (K-3)*[4] | 0 | 0 | 0 | 0 | 10 | 0 |
| Results of Evaluation | | | | | | |
| Elastic Modulus in Bending (MPa) | 2,480 | 2,180 | 1,880 | 2,290 | 2,300 | 2,600 |
| Izod Impact Strength (J/m) | 30 | 34 | 37 | 34 | 31 | 30 |
| Surface Resistivity (Ω/sq.) | $10^9$ | $10^8$ | $10^8$ | $10^9$ | $10^9$ | $10^9$ |
| Formability | ◉ | ◉ | ◉ | ◉ | ◯ | ◯ |
| Surface Smoothness | ◉ | ◉ | ◉ | ◉ | ◉ | ◉ |
| Dimensional Stability | ◉ | ◉ | ◉ | ◯ | ◯ | ◯ |
| Defects such as Warping, Sink Marks and Deformation | No defects | No defects | No defects | Slight warping | Slight warping | Slight warping |

TABLE 25

| Example | 116 | 117 | 118 | 119 | 120 | 121 | 122 | 123 | 124 |
|---|---|---|---|---|---|---|---|---|---|
| Compounding Formulation (parts) | | | | | | | | | |
| ABS Resin (I-1) | 90 | 90 | 90 | 85 | 80 | 75 | 90 | 90 | 90 |
| Polyamide-Based (J-4) | 10 | 10 | 10 | 10 | 10 | 10 | 10 | 10 | 10 |
| PEEA-Based (J-5) | | | | | | | | | |
| (I) + (J) | 100 | 100 | 100 | 100 | 100 | 100 | 100 | 100 | 100 |
| (C-1) | 1.0 | 1.0 | 1.0 | 1.0 | 1.0 | 1.0 | 1.0 | 1.0 | 1.0 |
| $LiClO_4$ (B-2) | 0.2 | 0.2 | 0.2 | 0.2 | 0.2 | 0.2 | 0.2 | 0.2 | 0.2 |
| Calcium Silicate Fiber (K-1)*[4] | 5 | 10 | 20 | 10 | 10 | 10 | 0 | 0 | 0 |
| Talc (K-2)*[4] | 0 | 0 | 0 | 0 | 0 | 0 | 10 | 0 | 20 |
| Mica (K-3)*[4] | 0 | 0 | 0 | 0 | 0 | 0 | 0 | 10 | 0 |
| Results of Evaluation | | | | | | | | | |
| Elastic Modulus in Bending (MPa) | 2450 | 2800 | 3400 | 2400 | 2100 | 1800 | 2200 | 2200 | 2500 |
| Izod Impact Strength (J/m) | 43 | 32 | 29 | 30 | 30 | 30 | 35 | 29 | 30 |

TABLE 25-continued

| Example | 116 | 117 | 118 | 119 | 120 | 121 | 122 | 123 | 124 |
|---|---|---|---|---|---|---|---|---|---|
| Surface Resistivity (Ω/sq.) | $10^9$ | $10^9$ | $10^9$ | $10^9$ | $10^8$ | $10^8$ | $10^9$ | $10^9$ | $10^9$ |
| Formability | ◎ | ◎ | ◎ | ◎ | ◎ | ◎ | ○ | ○ | ○ |
| Surface Smoothness | ◎ | ◎ | ◎ | ◎ | ◎ | ◎ | ○ | ○ | ○ |
| Dimensional Stability | ◎ | ◎ | ◎ | ◎ | ◎ | ◎ | ○ | ○ | ◎ |
| Defects such as Warping, Sink Marks and Deformation | No defects | No defects | No defects | No defects | No defects | No defects | Slight warping | Slight warping | Slight warping |

TABLE 26

| Comparative Example | 25 | 26 | 27 | 28 | 29 |
|---|---|---|---|---|---|
| Compounding Formulation (parts) | | | | | |
| ABS Resin (I-1) | 90 | 85 | 80 | 75 | 75 |
| Polyurethane-Based (J-1) | 10 | 15 | 20 | 25 | 10 |
| (I) + (J) | 100 | 100 | 100 | 100 | 100 |
| (C-1) | 0 | 0 | 0 | 0 | 0 |
| LiClO$_4$ (B-2) | 0.2 | 0.2 | 0.2 | 0.2 | 0 |
| Calcium Silicate Fiber (K-1)*4 | 0 | 0 | 0 | 0 | 0 |
| Class Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,920 | 1,840 | 1,540 | 1,650 | 1,950 |
| Izod Impact Strength (J/m) | 52 | 40 | 40 | 40 | 50 |
| Surface Resistivity (Ω/sq.) | $10^{12}$ | $10^{11}$ | $10^{10}$ | $10^9$ | $10^{12}$ |
| Formability | ◎ | ◎ | ◎ | ◎ | ◎ |
| Surface Smoothness | ◎ | ◎ | ◎ | ◎ | ◎ |
| Dimensional Stability | ○ | Δ | X | X | ○ |
| Defects such as Warping, Sink Marks and Deformation | Slight sink marks | Sink marks, warping | Sink marks, warping deformation | Sink marks, warping deformation | Slight sink marks |

| Comparative Example | 30 | 31 | 32 | 33 | 34 |
|---|---|---|---|---|---|
| Compounding Formulation (parts) | | | | | |
| ABS Resin (I-1) | 75 | 90 | 85 | 80 | 75 |
| Polyurethane-Based (J-1) | 25 | 10 | 15 | 20 | 25 |
| (I) + (J) | 100 | 100 | 100 | 100 | 100 |
| (C-1) | 0 | 1.0 | 1.0 | 1.0 | 1.0 |
| LiClO$_4$ (B-2) | 0 | 0.2 | 0.2 | 0.2 | 0.2 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,360 | 2,080 | 1,880 | 1,720 | 1,580 |
| Izod Impact Strength (J/m) | 41 | 32 | 35 | 42 | 45 |
| Surface Resistivity (Ω/sq.) | $10^{10}$ | $10^9$ | $10^9$ | $10^8$ | $10^8$ |
| Formability | ◎ | ◎ | ◎ | ◎ | ◎ |
| Surface Smoothness | ◎ | ◎ | ◎ | ◎ | ◎ |
| Dimensional Stability | X | Δ | X | X | X |
| Defects such as Warping, Sink Marks and Deformation | Sink marks, warping, deformation | Sink marks | Sink marks, warping, deformation | Sink marks, warping, deformation | Sink marks, warping, deformation |

TABLE 27

| Comparative Example | 35 | 36 | 37 | 38 |
|---|---|---|---|---|
| Compounding Formulation (parts) | | | | |
| ABS Resin (I-1) | 90 | 85 | 80 | 75 |
| Polyurethane-Based (J-1) | 0 | 0 | 0 | 0 |
| Polyetherester-Based (J-2) | 10 | 15 | 20 | 25 |
| (I) + (J) | 100 | 100 | 100 | 100 |
| (C-1) | 0 | 0 | 0 | 0 |
| LiClO$_4$ (B-2) | 0.2 | 0.2 | 0.2 | 0.2 |
| Calcium Silicate Fiber (K-1)*4 | 0 | 0 | 0 | 0 |
| Glass Fiber (T-1)*4 | 0 | 0 | 0 | 0 |
| Carbon Fiber (T-2)*4 | 0 | 0 | 0 | 0 |

TABLE 27-continued

| Results of Evaluation | | | | |
|---|---|---|---|---|
| Elastic Modulus in Bending (MPa) | 2,100 | 1,950 | 1,680 | 1,780 |
| Izod Impact Strength (J/m) | 45 | 38 | 40 | 41 |
| Surface Resistivity (Ω/sq.) | $10^{12}$ | $10^{11}$ | $10^{10}$ | $10^{9}$ |
| Formability | ◉ | tc ◉ | ◉ | ◉ |
| Surface Smoothness | ◉ | ◉ | ◉ | ◉ |
| Dimensional Stability | ○ | Δ | X | X |
| Defects such as Warping, Sink Marks and Deformation | Slight sink marks | Sink marks, warping | Sink marks, warping, deformation | Sink marks, warping, deformation |

| Comparative Example | 39 | 40 | 41 | 42 |
|---|---|---|---|---|
| Compounding Formulation (parts) | | | | |
| ABS Resin (I-1) | 90 | 75 | 90 | 85 |
| Polyurethane-Based (J-1) | 0 | 0 | 0 | 0 |
| Polyetherester-Based (J-2) | 10 | 25 | 10 | 15 |
| (I) + (J) | 100 | 100 | 100 | 100 |
| (C-1) | 0 | 0 | 1.0 | 1.0 |
| LiClO$_4$ (B-2) | 0 | 0 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 2,100 | 1,480 | 2,120 | 1,980 |
| Izod Impact Strength (J/m) | 49 | 39 | 33 | 35 |
| Surface Resistivity (Ω/sq.) | $10^{13}$ | $10^{11}$ | $10^{9}$ | $10^{9}$ |
| Formability | ◉ | ◉ | ◉ | ◉ |
| Surface Smoothness | ◉ | ◉ | ◉ | ◉ |
| Dimensional Stability | ○ | X | Δ | X |
| Defects such as Warping, Sink Marks and Deformation | Slight sink marks | Sink marks, warping deformation | Sink marks | Sink marks, warping deformation |

TABLE 28

| Comparative Example | 43 | 44 | 45 | 46 |
|---|---|---|---|---|
| Compounding Formulation (parts) | | | | |
| ABS Resin (I-1) | 80 | 75 | 90 | 85 |
| Polyetherester-Based (J-2) | 20 | 25 | 0 | 0 |
| Polyamide-Based (J-4) | 0 | 0 | 10 | 15 |
| (I) + (J) | 100 | 100 | 100 | 100 |
| (C-1) | 1.0 | 1.0 | 0 | 0 |
| LiClO$_4$ (B-2) | 0.2 | 0.2 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 1,780 | 1,680 | 1,980 | 1,890 |
| Izod Impact Strength (J/m) | 37 | 38 | 45 | 37 |
| Surface Resistivity (Ω/sq.) | $10^{8}$ | $10^{8}$ | $10^{12}$ | $10^{11}$ |
| Formability | ◉ | ◉ | ◉ | ◉ |
| Surface Smoothness | ◉ | ◉ | ◉ | ◉ |
| Dimensional Stability | X | X | ○ | Δ |
| Defects such as Warping, Sink Marks and Deformation | Sink marks, warping, deformation | Sink marks, warping, deformation | Slight sink marks | Sink marks, warping |

| Comparative Example | 47 | 48 | 49 | 50 |
|---|---|---|---|---|
| Compounding Formulation (parts) | | | | |
| ABS Resin (I-1) | 80 | 75 | 90 | 75 |
| Polyetherester-Based (J-2) | 0 | 0 | 0 | 0 |
| Polyamide-Based (J-4) | 20 | 25 | 10 | 25 |
| (I) + (J) | 100 | 100 | 100 | 100 |
| (C-1) | 0 | 0 | 0 | 0 |
| LiClO$_4$ (B-2) | 0.2 | 0.2 | 0 | 0 |
| Calcium Silicate Fiber (K-1)*[4] | 0 | 0 | 0 | 0 |
| Glass Fiber (T-1)*[4] | 0 | 0 | 0 | 0 |

TABLE 28-continued

| | | | | |
|---|---|---|---|---|
| Carbon Fiber (T-2)*4 | 0 | 0 | 0 | 0 |
| Results of Evaluation | | | | |
| Elastic Modulus in Bending (MPa) | 1,590 | 1,700 | 2,000 | 1,390 |
| Izod Impact Strength (J/m) | 36 | 36 | 48 | 38 |
| Surface Resistivity (Ω/sq.) | $10^8$ | $10^9$ | $10^{13}$ | $10^{11}$ |
| Formability | ⊙ | ⊙ | ⊙ | ⊙ |
| Surface Smoothness | ⊙ | ⊙ | ⊙ | ⊙ |
| Dimensional Stability | X | X | ○ | X |
| Defects such as Warping, Sink Marks and Deformation | Sink marks, warping, deformation | Sink marks, warping, deformation | Slight sink marks | Sink marks, warping, deformation |

TABLE 29

| Comparative Example | 51 | 52 | 53 | 54 | 55 |
|---|---|---|---|---|---|
| Compounding Formulation (parts) | | | | | |
| ABS Resin (I-1) | 90 | 85 | 80 | 75 | 90 |
| Polyamide-Based (J-4) | 10 | 15 | 20 | 25 | 0 |
| Polyester-Based (J-3) | 0 | 0 | 0 | 0 | 10 |
| (I) + (J) | 100 | 100 | 100 | 100 | 100 |
| (C-1) | 1.0 | 1.0 | 1.0 | 1.0 | 0 |
| LiClO$_4$ (B-2) | 0.2 | 0.2 | 0.2 | 0.2 | 0.2 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 2,090 | 1,890 | 1,740 | 1,600 | 2,100 |
| Izod Impact Strength (J/m) | 32 | 32 | 32 | 32 | 44 |
| Surface Resistivity (Ω/sq.) | $10^9$ | $10^9$ | $10^8$ | $10^8$ | $10^{12}$ |
| Formability | ⊙ | ⊙ | ⊙ | ⊙ | ⊙ |
| Surface Smoothness | ⊙ | ⊙ | ⊙ | ⊙ | ⊙ |
| Dimensional Stability | Δ | X | X | X | ○ |
| Defects such as Warping, Sink Marks and Deformation | Sink marks | Sink marks warping, deformation | Sink marks warping, deformation | Sink marks warping, deformation | Slight sink marks |

| Comparative Example | 56 | 57 | 58 | 59 | 60 |
|---|---|---|---|---|---|
| Compounding Formulation (parts) | | | | | |
| ABS Resin (I-1) | 85 | 80 | 75 | 90 | 75 |
| Polyamide-Based (J-4) | 0 | 0 | 0 | 0 | 0 |
| Polyester-Based (J-3) | 15 | 20 | 25 | 10 | 25 |
| (I) + (J) | 100 | 100 | 100 | 100 | 100 |
| (C-1) | 0 | 0 | 0 | 0 | 0 |
| LiClO$_4$ (B-2) | 0.2 | 0.2 | 0.2 | 0 | 0 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,980 | 1,700 | 1,780 | 2,100 | 1,500 |
| Izod Impact Strength (J/m) | 36 | 36 | 35 | 45 | 36 |
| Surface Resistivity (Ω/sq.) | $10^{11}$ | $10^{10}$ | $10^9$ | $10^{13}$ | $10^{11}$ |
| Formability | ⊙ | ⊙ | ⊙ | ⊙ | ⊙ |
| Surface Smoothness | ⊙ | ⊙ | ⊙ | ⊙ | ⊙ |
| Dimensional Stability | Δ | X | X | ○ | X |
| Defects such as Warping, Sink Marks and Deformation | Sink marks, warping | Sink marks, warping, deformation | Sink marks, warping, deformation | Slight sink marks | Sink marks, warping, deformation |

TABLE 30

| Comparative Example | 61 | 62 | 63 | 64 |
|---|---|---|---|---|
| Compounding Formulation (parts) | | | | |
| ABS Resin (I-1) | 90 | 85 | 80 | 75 |
| Polyester-Based (J-3) | 10 | 15 | 20 | 25 |
| (I) + (J) | 100 | 100 | 100 | 100 |

TABLE 30-continued

| Comparative Example | 61 | 62 | 63 | 64 |
|---|---|---|---|---|
| (C-1) | 1.0 | 1.0 | 1.0 | 1.0 |
| LiClO$_4$ (B-2) | 0.2 | 0.2 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 2,180 | 1,980 | 1,800 | 1,700 |
| Izod Impact Strength (J/m) | 30 | 31 | 32 | 30 |
| Surface Resistivity (Ω/sq.) | 10$^9$ | 10$^9$ | 10$^9$ | 10$^8$ |
| Formability | ⊚ | ⊚ | ⊚ | ⊚ |
| Surface Smoothness | ⊚ | ⊚ | ⊚ | ⊚ |
| Dimensional Stability | Δ | X | X | X |
| Defects such as Warping, Sink Marks and Deformation | Sink marks | Sink marks, warping, deformation | Sink marks, warping, deformation | Sink marks, warping, deformation |

TABLE 31

| Comparative Example | 65 | 66 | 67 | 68 |
|---|---|---|---|---|
| Compounding Formulation (parts) | | | | |
| ABS Resin (I-1) | 90 | 85 | 80 | 75 |
| PEEA-Based (J-5) | 10 | 15 | 20 | 25 |
| (I) + (J) | 100 | 100 | 100 | 100 |
| (C-1) | 1.0 | 1.0 | 1.0 | 1.0 |
| LiClO$_4$ (B-2) | 0.2 | 0.2 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 2,100 | 1,900 | 1,750 | 1,600 |
| Izod Impact Strength (J/m) | 29 | 30 | 30 | 30 |
| Surface Resistivity (Ω/sq.) | 10$^9$ | 10$^9$ | 10$^9$ | 10$^8$ |
| Formability | ⊚ | ⊚ | ⊚ | ⊚ |
| Surface Smoothness | ⊚ | ⊚ | ⊚ | ⊚ |
| Dimensional Stability | | | | |
| Defects such as Warping, Sink Marks and Deformation | Sink marks | Sink marks, warping, deformation | Sink marks, warping, deformation | Sink marks, warping, deformation |

In the above tables, * is as follows.
*[4]; Parts based on 100 parts of the total of components (J) to (C)

By Examples of the above tables, all the antistatic compositions of the present invention kept the surface resistivity low, and were excellent in the balance of elastic modulus in bending, strength, formability, surface smoothness, dimensional stability and the like. On the other hand, Comparative Examples of the above tables, which were outside the compounding range of the present invention, lacked any of constituent elements (I) to (K), and did not achieve the effect of the present invention.

Seventh Composition

Various types of components used in examples and comparative examples were as follows:

REFERENCE EXAMPLES 1 TO 5

Lithium perchlorate (B-2), lithium trifluoromethanesulfonate (B-4), bis(trifluoromethanesulfonyl) imidolithium (B-1) and tris(trifluoromethanesulfonyl) methanelithium (B-5), which are component (B), were each mixed with bis[2-(2-butoxyethoxy)ethyl]adipate (C-1) and bis(2-butoxyethyl) phthalate (C-5), which are component (C), at compounding ratios shown in the following table, and stirred at 65° C. for 1.5 hours to obtain solutions C-1 to C-5. The compounding ratio of bis[2-(2-butoxyethoxy)ethyl]adipate (C-1) to bis(2-butoxyethyl) phthalate (C-5) in component (C) of Reference Example 4 was 3:7.

TABLE 32

| Reference Example Solution | 1 X-1 | 2 X-2 | 3 X-3 | 4 X-4 | 5 X-5 |
|---|---|---|---|---|---|
| Component (B); | — | — | — | — | — |
| Lithium Perchlorate (B-2) | 20 | — | — | — | — |
| Lithium trifluoromethane-sulfonate (B-4) | — | 15 | — | 15 | — |
| Bis(trifluoromethanesulfonyl)-imidolithium (B-1) | — | — | 25 | — | — |
| Tris(trifluoromethane-sulfonyl)methanelithium (B-5) | — | — | — | — | 10 |
| Component (C); | | | | | |
| Bis[2-(2-butoxyethoxy)ethyl] adipate (C-1) | 80 | 85 | 75 | 25.5 | 90 |
| Bis(2-butoxyethyl) phthalate (C-5) | — | — | — | 59.5 | — |

EXAMPLES 125 TO 129

Three parts of zinc oxide, 1 part of stearic acid, 75 parts of silica white and 10 parts of each of solutions (X-1) to (X-5) of the above table were compounded with 100 parts of acrylonitrile butadiene rubber (NBR) (trade name: N520 (containing 40% of acrylonitrile), manufactured by JSR Corporation, Tg: −25° C.) as polymer (L), followed by kneading with rolls. Then, 2 parts of sulfur and 2 parts of a vulcanization accelerator were added, followed by further kneading with rolls. The kneaded product was formed with a press at 160° C. to prepare a 1 mm thick sheet. In Examples and Comparative Examples, tetraethylthiuram sulfide (TMTD), NOCCELER-TT (trade name) manufactured by OUCHI SHINKO CHEMICAL INDUSTRIAL CO., Ltd., was used as the vulcanization accelerator.

EXAMPLES 130 TO 132

Five parts of zinc oxide, 1 part of stearic acid, 65 parts of silica white, 10 parts of naphthenic process oil and 10 parts of each of solutions X-1, X-3 and X-4 of the above table were compounded with 100 parts of chloroprene rubber (CR) (trade name: M-41, manufactured by DENKI KAGAKU KOGYO KABUSHIKI KAISHA, Tg: −51° C.), followed by kneading with rolls. Then, 2 parts of sulfur and 2 parts of a vulcanization accelerator were added, followed by further kneading with rolls. The kneaded product was formed with a press at 160° C. to prepare a 1 mm thick sheet.

EXAMPLES 133 TO 135

Five parts of zinc oxide, 1 part of stearic acid, 75 parts of silica white and 10 parts of each of solutions X-1, X-3 and X-4 of the above table were compounded with 100 parts of acrylic rubber (ANM) (trade name: AR201, manufactured by JSR Corporation, Tg: −41° C.), followed by kneading with rolls. Then, 2 parts of sulfur and 2 parts of a vulcanization accelerator were added, followed by further kneading with rolls. The kneaded product was formed with a press at 170° C. to prepare a 1 mm thick sheet.

COMPARATIVE EXAMPLE 69

A 1 mm thick sheet was prepared in the same manner as with Example 125 with the exception that component (C) was not used.

COMPARATIVE EXAMPLE 70

A 1 mm thick sheet was prepared in the same manner as with Example 130 with the exception that component (C) was not used.

COMPARATIVE EXAMPLE 71

A 1 mm thick sheet was prepared in the same manner as with Example 133 with the exception that component (C) was not used.

COMPARATIVE EXAMPLE 72

A 1 mm thick sheet was prepared in the same manner as with Example 125 with the exception that 10 parts of a polyethylene glycol (PEG) solution in which bis(trifluoromethanesulfonyl)imidolithium (B-1) was dissolved in PEG (the degree of polymerization: 600, containing 20% of acetonitrile) to give 35% was used in place of solution X-1.

Evaluation of Rubber Compositions

The surface resistivity (JIS K6723) of the sheets prepared in Examples 125 to 135 was as very low as $10^8$ to $10^9$ Ω/sq., and the occurrence of the bleeding-out was not observed. In contrast, as for the rubber compositions using no component (C) prepared in Comparative Examples 69 to 72, the surface resistivity was from $10^{14}$ to $10^{15}$ Ω/sq., and the antistatic properties were not observed. Further, although the surface resistivity of the sheet prepared in Comparative Example 72 was from $10^8$ to $10^9$ Ω/sq., the occurrence of the bleeding-out was much observed. Results are shown in the following tables.

As for the coloring properties of the rubber compositions of Examples 125 to 135, the compositions visually showed a white color as a result of coloring with silica white, so that coloring was possible. On the other hand, Comparative Examples 69 to 72 showed a white color, so that coloring was possible. However, they were unfit for practical use with respect to the antistatic function.

Antistatic Durability

Surfaces of the test pieces of Examples 125 to 135 were wiped 20 times with a cloth impregnated with a domestic detergent, and after drying with a hair dryer, the surface resistivity was measured again. As a result, it was confirmed that all showed excellent durability of $10^8$ to $10^9$ Ω/sq.

TABLE 33

| Examples | 125 | 126 | 127 | 128 | 129 |
|---|---|---|---|---|---|
| Compounding Ratio (parts) | | | | | |
| Rubber (L); Kind | NBR | NBR | NBR | NBR | NBR |
| Amount | 100 | 100 | 100 | 100 | 100 |
| Solution [Component (C) + Component (B)]; | | | | | |
| Kind | X-1 | X-2 | X-3 | X-4 | X-5 |
| Amount | 10 | 10 | 10 | 10 | 10 |
| Results of Evaluation | | | | | |
| Surface Resistivity (Ω/sq.) | $10^9$ | $10^9$ | $10^8$–$10^9$ | $10^9$ | $10^9$ |
| Bleeding-out | Nil | Nil | Nil | Nil | Nil |

TABLE 34

| Examples | 130 | 131 | 132 | 133 | 134 | 135 |
|---|---|---|---|---|---|---|
| Compounding Ratio (parts) | | | | | | |
| Rubber(L); Kind | CR | CR | CR | ANM | ANM | ANM |
| Amount | 100 | 100 | 100 | 100 | 100 | 100 |
| Solution [Component (C) + Component (B)]; | | | | | | |
| Kind | X-1 | X-3 | X-4 | X-1 | X-3 | X-4 |
| Amount | 10 | 10 | 10 | 10 | 10 | 10 |
| Results of Evaluation | | | | | | |
| Surface Resistivity (Ω/sq.) | $10^9$ | $10^8$–$10^9$ | $10^9$ | $10^9$ | $10^8$–$10^9$ | $10^9$ |
| Bleeding-out | Nil | Nil | Nil | Nil | Nil | Nil |

TABLE 35

| Comparative Example | 69 | 70 | 71 | 72 |
|---|---|---|---|---|
| Compounding Ratio (parts) | | | | |
| Rubber(L); Kind | NBR | ANM | CR | NBR |
| Amount | 100 | 100 | 100 | 100 |
| Solution [Component (C) + Component (B)]; Amount | 0 | 0 | 0 | 0 |
| PEG Solution; Amount | 0 | 0 | 0 | 10 |
| Results of Evaluation | | | | |
| Surface Resistivity ($\Omega$/sq.) | $10^{14}$–$10^{15}$ | $10^{14}$–$10^{15}$ | $10^{14}$–$10^{15}$ | $10^{8}$–$10^{9}$ |
| Bleeding-out | Nil | Nil | Nil | Much |

From the above tables, the rubber compositions of Examples of the present invention were all thermally stable, and had no problems of the bleeding-out and the like, while maintaining excellent antistatic properties. On the other hand, in Comparative Examples of the above tables, when the antistatic agent of the present invention was not added, the antistatic properties were poor, and when the conventional antistatic agent was added, the bleeding-out occurred.

INDUSTRIAL APPLICABILITY

In the compositions of the present invention, the bleeding-out of electric conductive substances is little, and the volume resistivity and formability are good. Further, the antistatic compositions of the present invention can be suitably used for antistatic measure applications requiring high antistatic properties, for example, such as electronic equipment parts, manufacturing machines of electronic materials, business equipment parts, the OA field, the home electric appliance field, automobile parts, building materials, floor materials, tires, tubes, hoses, packaging films, packaging materials, covering applications such as sealing materials, particularly covering of casters used in hospitals, clean rooms and the like, gloves and synthetic leathers.

The invention claimed is:

1. An antistatic composition containing 8 to 60 parts by weight of (F) a plasticizer comprising (C) an organic compound which has an —{O(AO)$_n$}— group wherein A represents an alkylene group having 2 to 4 carbon atoms and n represents an integer of 1 to 7, all molecular chain terminals of which are CH$_3$ and/or CH$_2$ groups, and
    0.01 to 5.0 parts by weight of (B) a metal salt composed of a cation which is selected from the group consisting of Li$^+$, Na$^+$, and K$^+$ and an anion which is selected from the group consisting of Cl$^-$, Br$^-$, F$^-$, I$^-$, NO$_3^-$, SCN$^-$, ClO$_4^-$, CF$_3$SO$_3^-$, BF$_4^-$, (CF$_3$SO$_2$)$_2$N$^-$, and (CF$_3$SO$_2$)$_3$C$^-$,
    based on 100 parts by weight of (E) a polylactic acid-based resin.

2. The antistatic composition according to claim 1, which is obtained by using as a master batch a pelletized compound obtained by melt kneading constituent components containing at least said components (E), (B) and (F), and further mixing it with component (E) and another additive component.

3. An antistatic composition containing
    0.00005 to 5.0 parts by weight of (B) a metal salt composed of a cation which is selected from the group consisting of Li$^+$, Na$^+$, and K$^+$ and an anion which is selected from the group consisting of Cl$^-$, Br$^-$, F$^-$, I$^-$, NO$_3^-$, SCN$^-$, ClO$_4^-$, CF$_3$SO$_3^-$, BF$_4^-$, (CF$_3$SO$_2$)$_2$N$^-$, and (CF$_3$SO$_2$)$_3$C$^-$ and
    0.03 to 15.0 parts by weight of (C) an organic compound which has an —{O(AO)$_n$}— group wherein A represents an alkylene group having 2 to 4 carbon atoms and n represents an integer of 1 to 7, all molecular chain terminals of which are CH$_3$ and/or CH$_2$ groups,
    based on 100 parts by weight of the total amount of 50 to 95 parts by weight of (E) a polylactic acid-based resin and 50 to 5 parts by weight of (G) a polyester resin having a glass transition temperature of 30° C. or less (provided (B)+(G)=100 parts by weight).

4. The antistatic composition according to claim 3, which is obtained by using as a master batch a pelletized compound obtained by melt kneading constituent components containing at least said components (B) and (G), and further mixing it with component (E) and another additive component.

5. The antistatic composition according to claim 3, wherein said component (B) is previously dissolved in said component (C).

* * * * *